(12) United States Patent
Ozeki et al.

(10) Patent No.: US 7,394,989 B2
(45) Date of Patent: Jul. 1, 2008

(54) SIGNAL TRANSMISSION DEVICE

(75) Inventors: Shinobu Ozeki, Ashigarakami-gun (JP); Kenichi Kobayashi, Ashigarakami-gun (JP); Hidenori Yamada, Ashigarakami-gun (JP); Shinya Kyozuka, Ashigarakami-gun (JP); Takehiro Niitsu, Ashigarakami-gun (JP); Kazuhiro Suzuki, Ashigarakami-gun (JP); Tomo Baba, Ashigarakami-gun (JP); Osamu Takanashi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 660 days.

(21) Appl. No.: 10/962,914

(22) Filed: Oct. 13, 2004

(65) Prior Publication Data
US 2005/0105913 A1    May 19, 2005

(30) Foreign Application Priority Data
Nov. 14, 2003  (JP)  ............................. 2003-385961
Jul. 12, 2004   (JP)  ............................. 2004-204184

(51) Int. Cl.
*H04B 10/12*  (2006.01)
*H04B 10/00*  (2006.01)
*H04B 10/08*  (2006.01)

(52) U.S. Cl. ................. 398/141; 398/140; 398/158; 398/13; 398/15

(58) Field of Classification Search ............. 398/140, 398/141, 151, 158, 162, 136, 137, 138, 139, 398/9, 13, 15–16, 25, 30, 33, 20, 135; 382/100
See application file for complete search history.

(56) References Cited

U.S. PATENT DOCUMENTS 5,528,409 A * 6/1996 Cucci et al. ................ 398/15

FOREIGN PATENT DOCUMENTS

| JP | B2 2838454 | 10/1998 |
|---|---|---|
| JP | A 2001-185783 | 7/2001 |
| JP | A 2003-209920 | 7/2003 |

* cited by examiner

*Primary Examiner*—M. R. Sedighian
(74) *Attorney, Agent, or Firm*—Oliff & Berridge, PLC

(57) ABSTRACT

A transmission unit of a signal transmission device includes: a transmission-side detection unit that detects image information from an inputted electrical signal; a receiving unit that receives, from a reception unit, a status signal representing an arrival status of an outputted optical signal; and a control unit that controls an electrical-optical conversion unit on the basis of the detection result of the transmission-side detection unit and the status signal of the receiving unit so that the output of the optical signal is shut down in at least one of a case where image information is not included in an electrical signal and a case where an optical signal has not arrived.

18 Claims, 17 Drawing Sheets

OPTICAL/ELECTRICAL CONVERSION CIRCUIT CONFIGURATION DIAGRAM

STANDBY TIME FLOW CHART

88: MONITOR
71: METAL DVI CABLE
86: HOST COMPUTER

DVI CABLE CONNECTION DIAGRAM

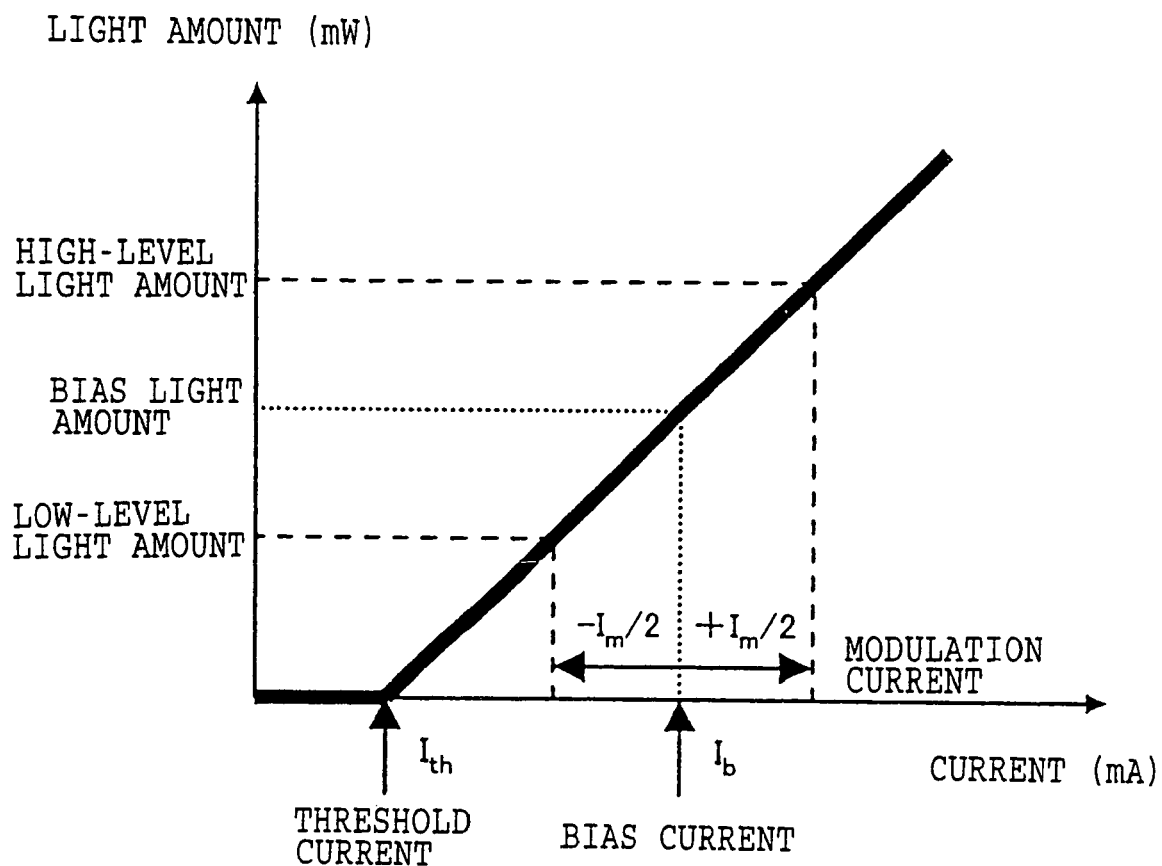
F I G. 13
LIGHT EMISSION CHARACTERISTICS OF SEMICONDUCTOR LASER

| Sig D | LOP | Rx SD | |
|---|---|---|---|
| L | X | L | NO IMAGE SIGNAL |
| L→H | X | H | IMAGE SIGNAL TRANSMISSION START |
| H | H | H | IMAGE SIGNAL NORMAL TRANSMISSION |
| H | L | L | THERE IS TRANSMISSION TROUBLE |

NO IMAGE SIGNAL:L  OPTICAL SIGNAL:H
IMAGE SIGNAL:H     NO OPTICAL SIGNAL:L

OPERATING STATE

Rx SHUTDOWN CONTROL

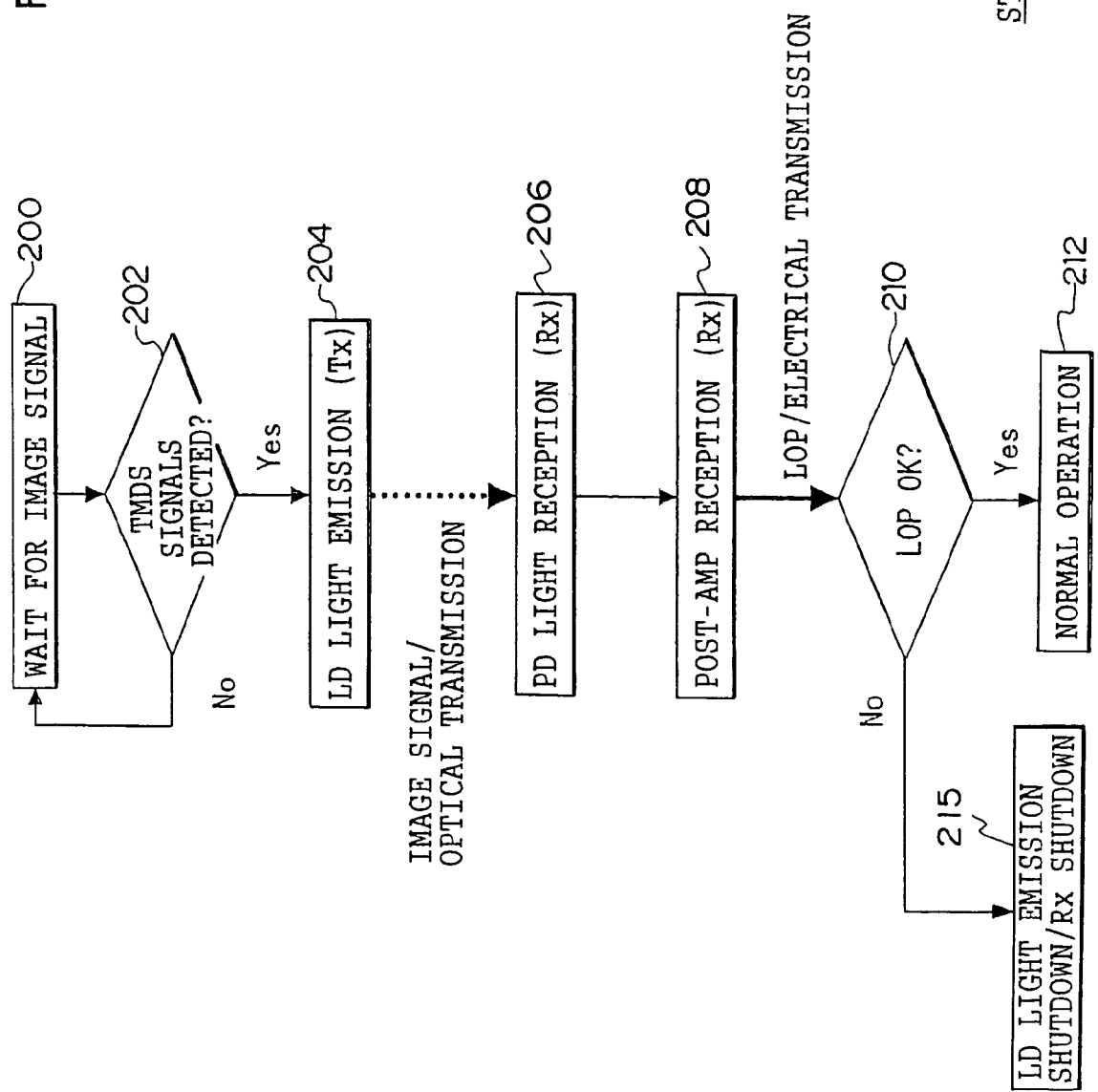

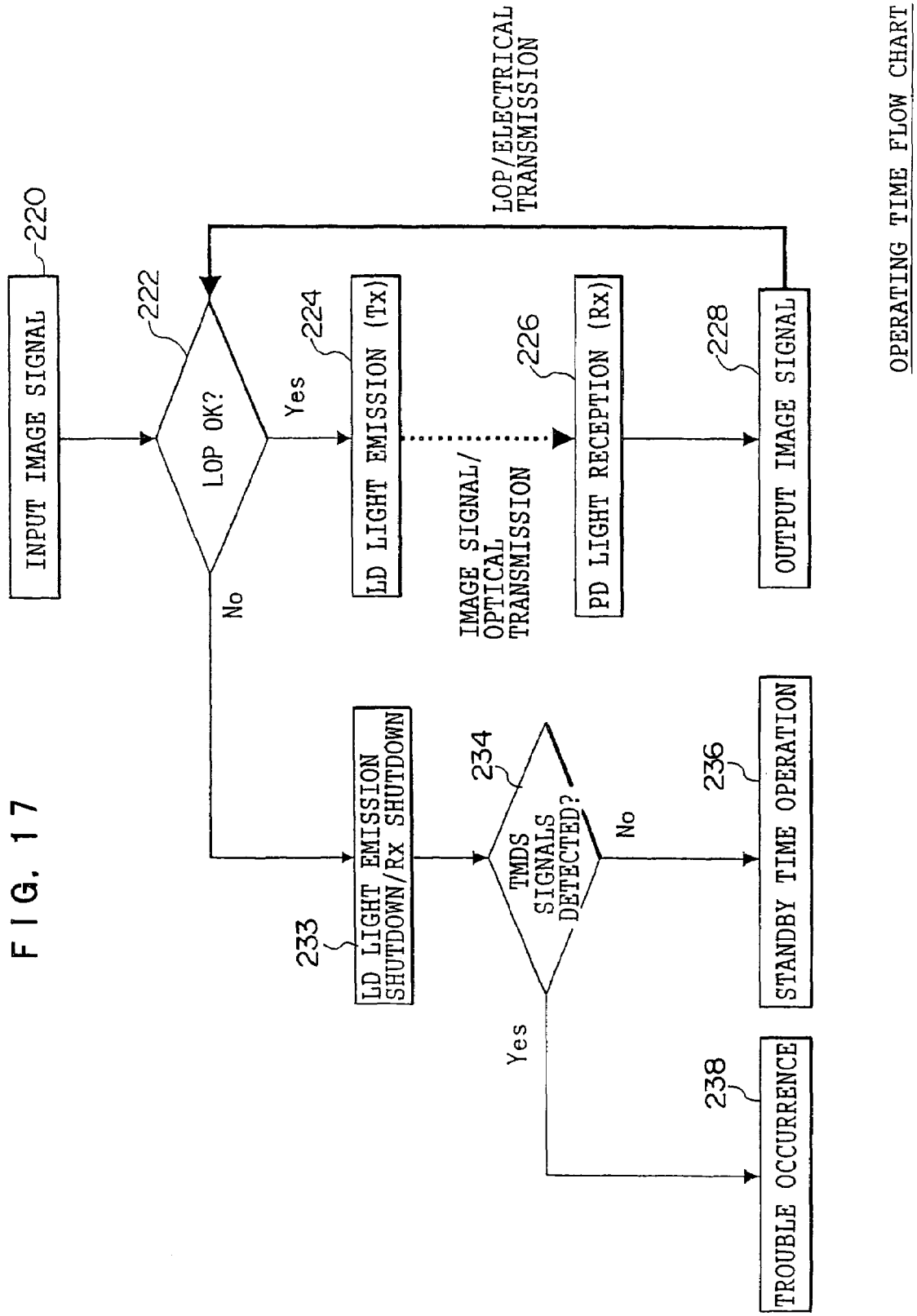

SIGNAL TRANSMISSION DEVICE

CROSS-REFERENCE TO RELATED APPLICATION

This application claims priority under 35 USC 119 from Japanese Patent Application Nos. 2003-385961 and 2004-204184, the disclosures of which are incorporated by reference herein.

BACKGROUND OF THE INVENTION

1. Field of the Invention

The present invention relates to a signal transmission device, and in particular to a signal transmission device that uses optical signals.

2. Description of the Related Art

In accompaniment with the increase in the resolution of liquid crystal panels and plasma displays, there is a demand to transmit, as digital signals, large-capacity image signals from a host. For example, in the Digital Visual Interface standard (DVI: a digital image transmission standard), which was established by the Digital Display Working Group (DDWG) that is an industry group, high-speed signals of 1.65 Gbps per 1 bit are transmitted using a differential signaling specification called transition minimized differential signaling (TMDS). A shield-attached metal cable widely used as a display cable is used as the transmission medium.

FIG. 11 shows an example where a host computer 86 and a monitor 88 are connected by a DVI cable 71 and image signals from the host computer 86 are displayed on the monitor 88. FIG. 12 shows a configural diagram of the DVI cable 71. TMDS signals in the DVI cable 71 are 4-bit differential signal pairs, and R, G and B of image signals and pixel clocks are allocated. The DVI cable 71 has a maximum transmission speed of 1.65 Gbps depending on the resolution of the image. Display data channel (DDC: display information) signals comprise (DDC Clock) and (DDC Data), and the display information (DDC) is exchanged between the host computer 86 and the monitor 88. A 5V Power signal and a hot plug detect signal (HPD: corresponding signal of the monitor) are level signals that give notification of the connection status of the host computer 86 and the monitor 88. When the host computer 86 starts up, the 5V Power signal becomes a high level, and when the 5V Power signal is inputted to the monitor 88 in a state where the host computer 86 and the monitor 88 are connected, the HPD signal becomes a high level. In addition to these, shield (GND) lines are plurally disposed in the metal DVI cable 71.

However, the length of the DVI cable 71 cannot be stretched more than 10 m because the signals that the DVI cable 71 handles are high speed. For this reason, cables (fiber cables, etc.) that convert high-speed signals to optical signals to realize long-distance transmission have also been proposed, but problems that must be resolved remain in terms of power consumption and safety in handling a laser light source for the optical signals.

For example, laser light is used in these optical transmission devices for emission light from the light source, but when there is unintentional cutting of the fiber cable or removal of the optical connector during operation, there is the potential for the laser light to leak to the outside and cause damage to human eyes. For this reason, technology that incorporates a safety circuit to stop laser light emission when the optical cable is unplugged has been proposed (e.g., see Japanese Patent Application Laid-pen Publication (JP-A) No. 2001-185783).

However, with respect to cables in which optical fiber and electrical wiring are mixed together, problems remain in that, when cutting of the light is determined only by the connection status of the electrical wiring, the cutting cannot be grasped when only the fiber cable has been cut, and the light emission cannot be appropriately stopped. Thus, it is actually preferable to monitor the reception status of the optical signal and stop light emission when normal optical signal is not being received. As a method of determining the status of transmission from the optical reception unit, technology has been proposed in the field of bi-directional optical communication that monitors the reception status of the optical signal and detects abnormalities (e.g., see Japanese Patent No. 2838454). By reflecting this technology in the aforementioned safety circuit that stops the laser light emission, it is possible to determine the connection status of the electrical wiring and the fiber cable and stop the laser light emission.

Also, as technology that achieves power saving in relation to optical extension cables, technology has been proposed that turns the power ON in accordance with the startup of the host in a state where the host and the monitor are normally connected (e.g., see JP-A No. 2003-209920). This technology proposes shutting down the power supply when the host computer and the monitor are not connected, to thereby reduce unnecessary power consumption. Thus, as long as the host computer and the monitor are normally connected, the optical transmission unit also starts up together with the startup of the host computer resulting from the power being turned ON, and the power supply of the optical transmission unit is also cut off due to the power of the host computer being cut off.

However, with respect to optical transmission devices, the function of detecting abnormalities in the optical signals and rapidly handling them and the function of achieving power saving are conflicting functions. Namely, the function of achieving power saving is technology that contradicts the safety circuit monitoring the actual optical signals. For example, sometimes the optical signal does not reach the reception circuit and, as a result, sometimes it is perceived that trouble has arisen during the time of the system startup from when the host computer is turned ON until the image signal is outputted when the initial setting of the system is being conducted (the so-called time lag), or in cases where the image signal stops when the resolution of the image is switched, or even in cases where the host computer temporarily stops the image signal within the range of normal operation.

SUMMARY OF THE INVENTION

The present invention has been made in view of the above circumstances and provides a signal transmission device.

The present invention is applied to a signal transmission device including: a transmission unit that converts an inputted electrical signal including image information into an optical signal including the image information, converts the electrical signal into an electrical control signal including control information other than the image information, outputs the optical signal, and inputs and outputs the control signal; a reception unit that inputs the optical signal, inputs and outputs the control signal, and outputs an output-use electrical signal including image information from the optical signal and the control signal; and a transmitting unit configured by an optical fiber cable that transmits the optical signal and an electrical cable that transmits the control signal.

In this signal transmission device, an electrical signal including information outputted from a host device such as a host computer and an electrical signal (control signal) including information other than image information are inputted to the transmission unit. In the reception unit, a device represented by an image display device such as a plasma display that displays an image is connected via an electrical cable. The transmission unit and the reception unit are connected by the transmitting unit configured by an optical fiber cable that transmits the optical signal and an electrical cable that transmits the control signal. Thus, the optical signal including image information is transmitted by the optical fiber cable, and the electrical signal (control signal) including information other than the image information is transmitted by the electrical cable.

In the signal transmission device, the transmission unit of the invention includes: an electrical-optical conversion unit that converts the inputted electrical signal into an optical signal including image information and outputs the optical signal; a transmission-side electrical signal input and output unit that is disposed independently from the electrical-optical conversion unit and inputs and outputs the control signal including control information other than the image information; a transmission-side detection unit that detects the image information from the inputted electrical signal; a receiving unit that receives, from the reception unit, a status signal representing an arrival status of the outputted optical signal; and a control unit that controls the electrical-optical conversion unit on the basis of the detection result of the transmission-side detection unit and the status signal of the receiving unit so that the output of the optical signal is shut down in at least one of a case where image information is not included in the electrical signal and a case where the optical signal has not arrived.

The electrical signal including image information inputted from the host device is converted to an optical signal including the image information and outputted by the electrical-optical conversion unit. Also, the electrical signal including control information other than image information is inputted and outputted by the transmission-side electrical signal input and output unit as a control signal including the control information. Here, the transmission-side detection unit detects the image information from the electrical signal inputted from the host device. Also, in the receiving unit, the status signal representing the arrival status of the outputted optical signal is received. The control unit controls the electrical-optical conversion unit on the basis of the detection result of the transmission-side detection unit and the status signal of the receiving unit so that the output of the optical signal is shut down in at least one of a case where image information is not included in the electrical signal and a case where the optical signal has not arrived. Thus, when image information is not included in the electrical signal, the output of the optical signal can be shut down because the output of the optical signal is unnecessary, so that power can be saved. Also, when the optical signal has not arrived, such as when the optical fiber cable has been cut or unplugged, there is the potential for the optical signal, i.e., laser light to leak to the outside. Thus, by shutting this down, the safety of the laser light can be secured. Moreover, in the case of both, power saving can be realized while securing the safety of the laser light.

In the signal transmission device, a reception unit of the invention includes: an optical-electrical conversion unit that converts the optical signal outputted from the transmission unit into an electrical signal and outputs the electrical signal, a reception-side electrical signal input and output unit that is disposed independently from the optical-electrical conversion unit and inputs and outputs the control signal including control information other than the image information, and a reception-side detection unit that detects an arrival status of the optical signal from the converted electrical signal and outputs, to the transmission unit, a status signal representing the arrival status of the optical signal of the detection result.

In the reception unit of the invention, the optical signal outputted from the transmission unit is converted and outputted in the optical-electrical conversion unit. The reception-side electrical signal input and output unit disposed independently from the optical-electrical conversion unit inputs and outputs the control signal including control information other than image information outputted from the transmission unit. In this case, the reception-side detection unit detects the arrival status of the optical signal from the electrical signal converted in the optical-electrical conversion unit, includes, in the control signal, the status signal representing the arrival status of the optical signal of the detection result, and outputs this to the transmission unit. Thus, the status signal representing the arrival status of the optical signal from the reception unit can be returned from the reception unit to the transmission unit, and on the basis of this, at the transmission side, as described above, power can be saved by shutting down the output of the optical signal when image information is not included in the electrical signal, and the safety of the laser light can be secured by preventing outside leakage of the optical signal, i.e., the laser light resulting from the non-arrival of the optical signal.

According to the signal transmission device disposed with the aforementioned transmission unit and reception unit, power can be saved by shutting down the output of the optical signal, and the safety of the laser light can be secured by preventing outside leakage of the optical signal, i.e., the laser light resulting from the non-arrival of the optical signal. Specifically, the signal transmission device of the invention includes: a transmission unit that includes an electrical-optical conversion unit that converts an inputted electrical signal into an optical signal including image information and outputs the optical signal, a transmission-side electrical signal input and output unit that is disposed independently from the electrical-optical conversion unit and inputs and outputs a control signal including control information other than the image information, a transmission-side detection unit that detects the image information from the inputted electrical signal, a receiving unit that receives, from the reception unit, a status signal representing an arrival status of the outputted optical signal, and a control unit that controls the electrical-optical conversion unit on the basis of the detection result of the transmission-side detection unit and the status signal of the receiving unit so that the output of the optical signal is shut down in at least one of a case where image information is not included in the electrical signal and a case where the optical signal has not arrived; a reception unit that includes an optical-electrical conversion unit that converts the optical signal outputted from the transmission unit into an electrical signal and outputs the electrical signal, a reception-side electrical signal input and output unit that is disposed independently from the optical-electrical conversion unit and inputs and outputs the control signal including control information other than the image information, and a reception-side detection unit that detects an arrival status of the optical signal from the converted electrical signal and outputs, to the transmission unit, a status signal representing the arrival status of the optical signal of the detection result; and a transmitting unit configured by an optical fiber cable that transmits the optical signal and an electrical cable that transmits the control signal.

With respect to the transmission unit side of the signal transmission device, in consideration of the power consumption of the reception unit, power can be saved by shutting down the output of the signal representing the power supply.

Specifically, a signal transmission device of the invention includes: a transmission unit that converts an inputted electrical signal including image information into an optical signal including the image information, converts the electrical signal into an electrical control signal including control information other than the image information, outputs the optical signal, and inputs and outputs the control signal; a reception unit that inputs the optical signal, inputs and outputs the control signal, and outputs an output-use electrical signal including image information from the optical signal and the control signal; and a transmitting unit configured by an optical fiber cable that transmits the optical signal and an electrical cable that transmits the control signal, wherein the transmission unit includes an electrical-optical conversion unit that converts the inputted electrical signal into an optical signal including image information and outputs the optical signal, a transmission-side electrical signal input and output unit that is disposed independently from the electrical-optical conversion unit and inputs and outputs the control signal including control information other than the image information, a transmission-side detection unit that detects the image information from the inputted electrical signal, a receiving unit that receives, from the reception unit, a status signal representing an arrival status of the outputted optical signal, and a prohibition unit that includes, in the control signal, a signal representing power supply and prohibits the signal from being outputted to the reception unit on the basis of the detection result of the transmission-side detection unit and the status signal of the receiving unit in at least one of a case where image information is not included in the electrical signal and a case where the optical signal has not arrived.

As described above, according to the present invention, the invention includes the excellent effects that power can be saved by shutting down the output of the optical signal when image information is not included in the electrical signal, the safety of the laser light can be secured by shutting down the output of the optical signal and preventing outside leakage of the laser light when the optical signal has not arrived such as when the optical fiber cable has been cut or unplugged, and either or both or these can be realized.

BRIEF DESCRIPTION OF THE DRAWINGS

Preferred embodiments of the present invention will be described in detail based on the following figures, wherein:

FIG. 13 is a characteristic diagram showing the relation between a light emission amount and an electrical current flowing in a forward direction of a diode of a semiconductor laser;

FIG. 16 is a flow chart showing the flow of an operation in a standby state of an optical transmission device pertaining to a second embodiment of the invention; and FIG. 17 is a flow chart showing the flow of an operation in an operating state of the optical transmission device pertaining to the second embodiment of the invention.

DETAILED DESCRIPTION OF THE INVENTION

An optical transmission device pertaining to embodiments of the invention will be described in detail below with reference to the drawings.

First Embodiment (Overall Configuration)

Figure 1:
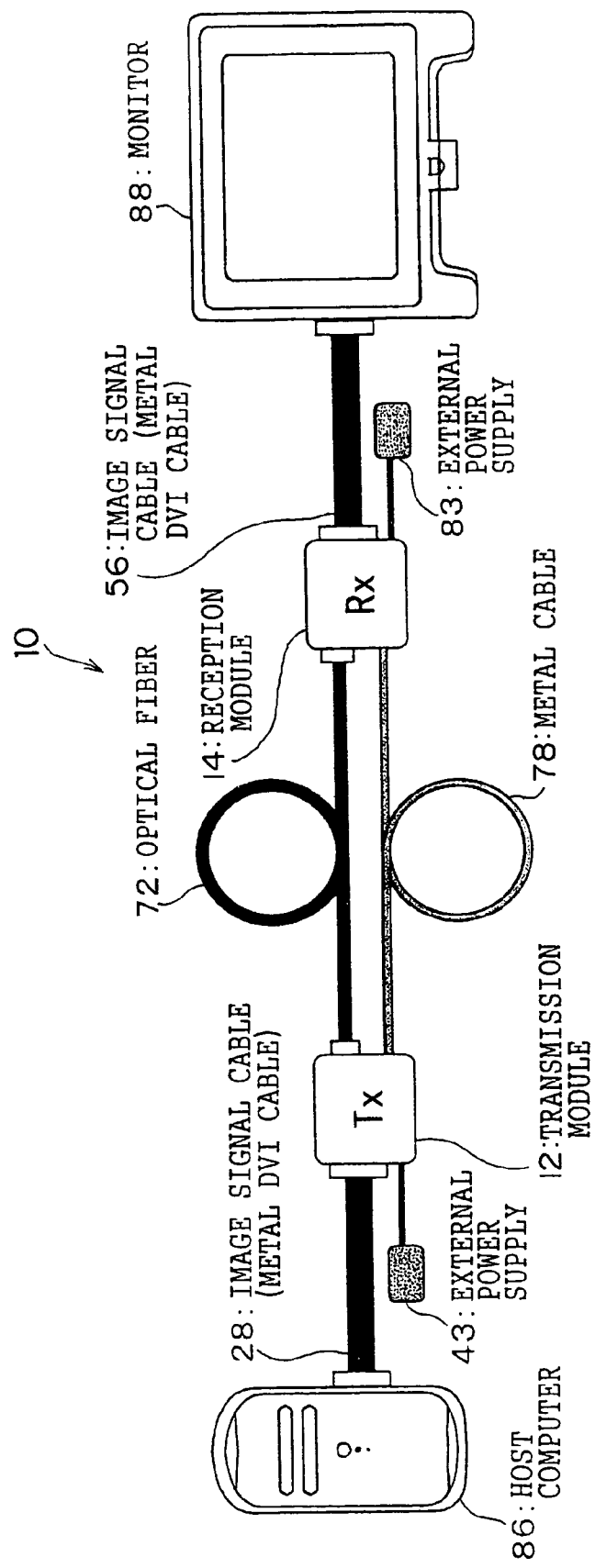
FIG. 1 is a diagram showing the overall configuration of an image signal transmission system pertaining to the embodiments of the invention.

As shown in FIG. 1, an image signal transmission system pertaining to the present embodiment is configured by a host computer 86, a monitor 88, an optical transmission device 10, an image signal cable 28 that is a metal DVI cable connecting the host computer 86 to the optical transmission device 10, and an image signal cable 56 that is a metal DVI cable connecting the monitor 88 to the optical transmission device 10. The optical transmission device 10 is configured by a transmission module 12, a reception module 14, and an optical fiber cable 72 and a metal cable (electrical cable) 78 that connect the transmission module 12 and the reception module 14. External power supplies 43 and 83 are connected to the transmission module 12 and the reception module 14 in order to supply power from the outside.

The optical transmission device 10 of the present embodiment corresponds to a signal transmission device of the invention, the transmission module 12 corresponds to a transmission unit of the invention, the reception module 14 corresponds to a reception unit of the invention, and the optical fiber cable 72 and the metal cable 78 correspond to an optical fiber cable and an electrical cable of the invention.

(Optical Transmission Device)

Figure 2:
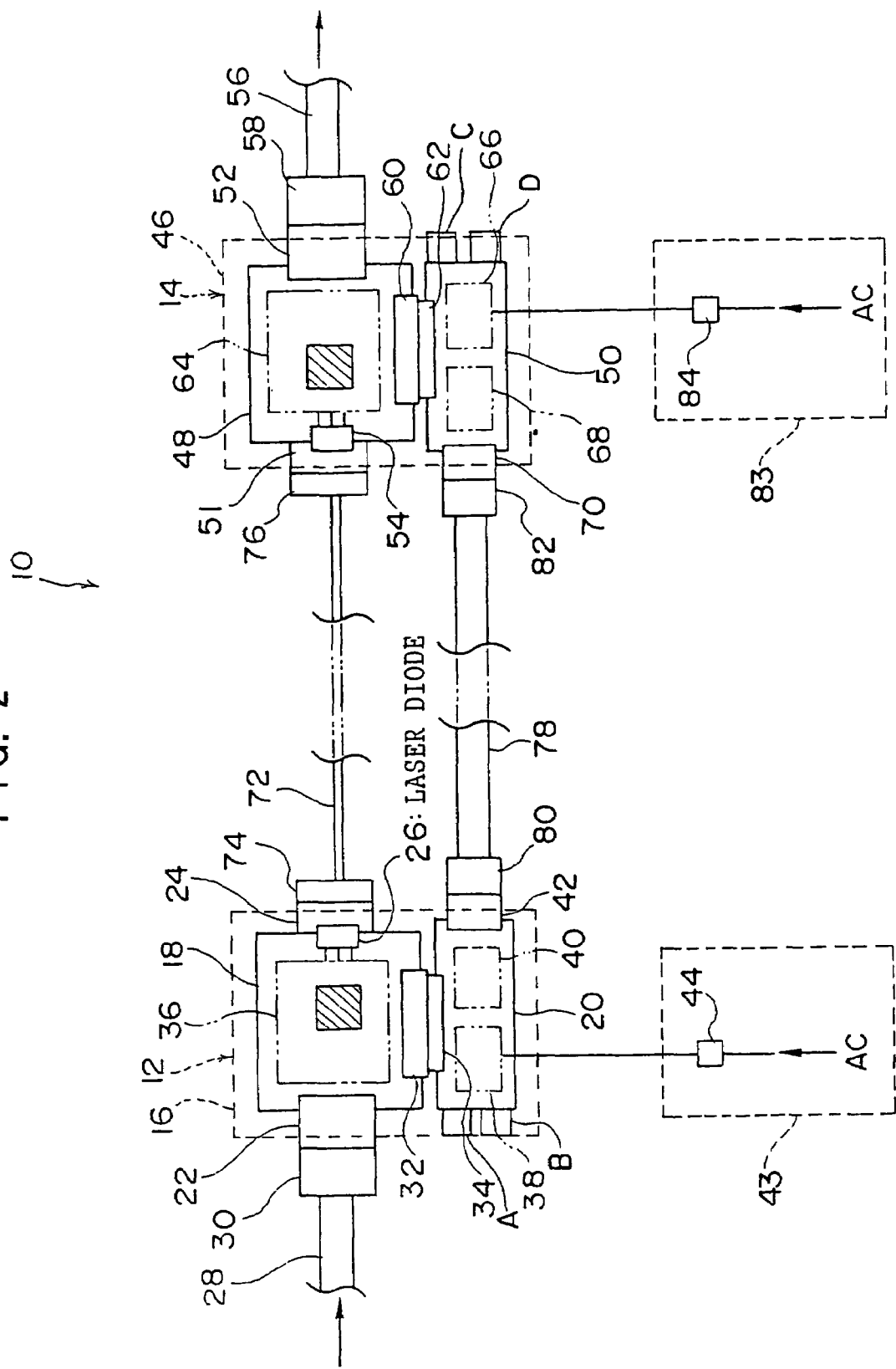
FIG. 2 is a diagram showing the overall configuration of an optical transmission device pertaining to the embodiments of the invention.

As shown in FIG. 2, the configuration of the optical transmission device 10 comprises the transmission module 12, the reception module 14, and the optical fiber cable 72 and the metal cable 78 that connect these.

(Transmission Module)

The transmission module 12 is disposed with a box-shaped housing 16 of the same shape as that of a later-described housing 46 of the reception module 14. Inside the housing 16 are disposed an electrical-optical conversion circuit board 18, which converts electrical signals to optical signals and transmits the optical signals, and an electrical signal transmission circuit board 20 that transmits inputted electrical signals. These boards are attached with screws to the housing 16. A female electrical connector 22 that inputs electrical signals is attached to one end of the electrical-optical conversion circuit board 18, and a female optical connector 24 that outputs optical signals is attached to the other end of the electrical-optical conversion circuit board 18. A laser diode 26 that outputs optical signals is internally housed in the female optical connector 24.

A male electrical connector 30 of an image signal cable 28, which is an image signal cable connected to the host computer 86, is connected to the female electrical connector 22. In the present embodiment, image signals and image control signals are outputted from a personal computer to the image signal cable 28.

Also, a female electrical connector 32 is attached to the electrical-optical conversion circuit board 18, and a male electrical connector 34 is attached to the electrical signal transmission circuit board 20. The female electrical connector 32 and the male electrical connector 34 are connected to each other. Two circuits—a power supply circuit 38 that supplies DC power to an electrical-optical conversion circuit 36 of the electrical-optical conversion circuit board 18, and an electrical signal transmission circuit 40 that transmits inputted image control signals—are disposed on the electrical signal transmission circuit board 20. Also, an external power supply 43 configured by an AC adapter 44 connected to an AC power supply is connected to the power supply circuit 38. The power supply circuit 38 controls the supply of the DC power to the electrical-optical conversion circuit 36.

The electrical signal transmission circuit board 20 is disposed with, for example, a green LED (indicated by letter "A" in the drawing) that displays the fact that the transmission module 12 is in operation. The LED (A) lights up during operation. The electrical signal transmission circuit board 20 is also disposed with, for example, a red LED (indicated by letter "B" in the drawing). The red LED (B) lights up when the transmission module 12 is not operating properly or when the signal transmission is poor. The LED (A) and the LED (B) are attached so as to be seen from the outside of the housing 16.

By poor signal transmission is meant, for example, a case where the optical fiber cable 72 is not connected or has been cut, so that the reception module 14 is unable to receive the optical signals from the optical fiber cable 72. The details will be described later.

(Reception Module)

The reception module 14 is disposed with a box-shaped housing 46 of the same shape as that of the housing 16 of the transmission module 12. Inside the housing 46 are disposed an optical-electrical conversion circuit board 48, which converts the received optical signals to electrical signals and outputs the electrical signals, and an electrical signal reception circuit board 50 that transmits inputted electrical signals. These boards are attached with screws to the housing 46. A female optical connector 51 that inputs optical signals is attached to one end of the optical-electrical conversion circuit board 48, and a female electrical connector 52 that outputs electrical signals is attached to the other end of the optical-electrical conversion circuit board 48.

A photodiode 54 that receives optical signals is internally housed in the female optical connector 51. A male electrical connector 58 of an image signal cable 56 connected to the monitor 88 (e.g., a plasma display) is connected to the female electrical connector 52. Image signals and image control signals from a later-described electrical signal reception circuit 68 are outputted from the female electrical connector 52.

Also, a female electrical connector 60 is attached to the optical-electrical conversion circuit board 48, and a male electrical connector 62 is attached to the electrical signal reception circuit board 50. The female electrical connector 60 and the male electrical connector 62 are connected to each other. A female electrical connector 70 for inputting the image control signals that the transmission module 12 has transmitted is attached to the electrical signal reception circuit board 50. Also, two circuits—a power supply circuit 66 that supplies DC power to the optical-electrical conversion circuit 64, and an electrical signal reception circuit 68 that receives the image control signals—are disposed on the electrical signal reception circuit board 50. Also, an external power supply 83 configured by an AC adapter 84 connected to an AC power supply is connected to the power supply circuit 66. The power supply circuit 66 controls the supply of the DC power to the optical-electrical conversion circuit 64.

The electrical signal reception circuit board 50 is disposed with, for example, a green LED (indicated by letter "C" in the drawing) that displays the fact that the reception module 14 is in operation. The LED (C) lights up during operation. The electrical signal reception circuit board 50 is also disposed with, for example, a red LED (indicated by letter "D" in the drawing). The red LED (D) lights up when it is detected by a diagnosis circuit that the reception module 14 is not operating properly or not receiving optical signals (when the transmission module 12 is not transmitting) or that the signal transmission is poor. The LED (C) and the LED (D) are attached so as to be seen from the outside of the housing 46. By poor signal transmission is meant, for example, a case where the optical fiber cable 72 is not connected or has been cut.

The reception module 14 includes a configuration where, in regard to the reception of the optical signals, it is determined, in accordance with the light amount of the optical signals, whether or not the optical signals from the transmission module 12 have reached the reception module 14, and which transmits an LOP signal (Loss of Power: light amount monitor signal) to the transmission module 12 via the metal cable 78.

(Electrical Connection Relation of the Optical Transmission Device)

Figure 3:
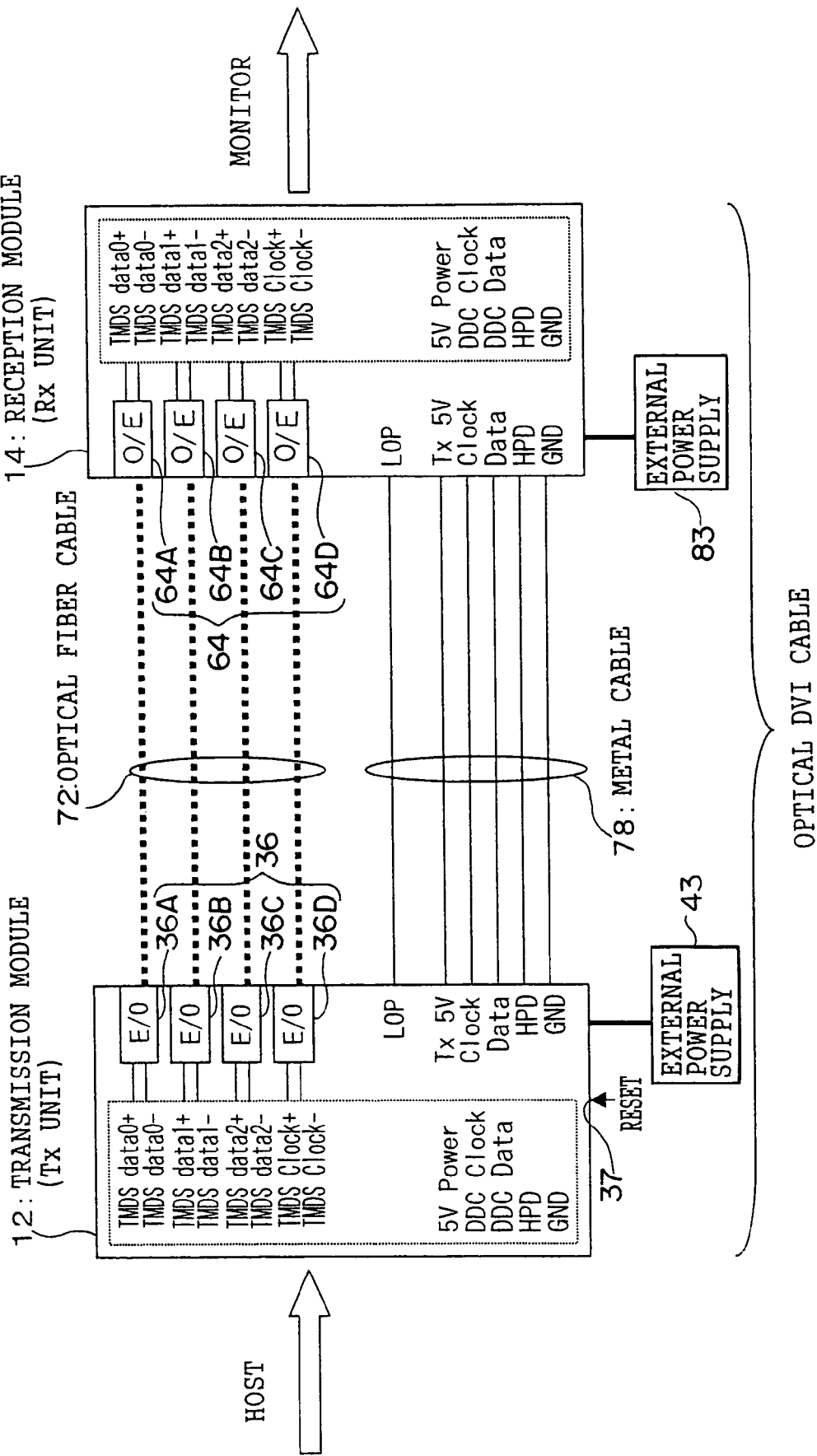
FIG. 3 is a schematic configural diagram showing an electrical and optical connection relation in the optical transmission device.

As shown in FIG. 3, the electrical and optical connection relation of the optical transmission device 10 is configured by the transmission module 12 and the reception module 14 being connected by the optical fiber cable 72 and the metal cable 78. In the transmission module 12, TMDS signals of the image signals inputted from the host computer 86 are inputted to electrical-optical conversion circuits 36A, 36B, 36C and 36D corresponding to the individual TMDS signals. Among the individual TMDS signals, there are signals of differential signal pairs comprising data0+ and data0−, data1+ and data1−, data2+ and data2−, and Clock+ and Clock−. The individual TMDS signals are converted to optical signals in the electrical-optical conversion circuits 36A to 36D and outputted. The reception module 14 is disposed with optical-electrical conversion circuits 64A, 64B, 64C and 64D in correspondence to these differential signal pair signals. Individual optical signals are converted to corresponding TMDS signals in the optical-electrical conversion circuits 64A to 64D and outputted. The electrical-optical conversion circuit 36 comprising the electrical-optical conversion circuits 36A to 36D and the optical-electrical conversion circuit 64 comprising the optical-electrical conversion circuits 64A to 64D are connected by the optical fiber cable 72.

In the transmission module 12, signals (control signals) other than the TMDS signals of the image signals inputted from the host computer 68 are outputted to the reception module 12. Among the signals (control signals) other than the TMDS signals, there are LOP (Loss of Power: light amount monitor signal, the details of which will be described later), 5V Power, DDC Clock, DDC Data, HPD and GND signals. These signals are transmitted between the transmission module 12 and the reception module 14 connected by the metal cable 78.

In terms of the directions of the signals between the transmission module 12 and the reception module 14, the TMDS signals run in one direction from the transmission module 12 (Tx) to the reception module 14 (Rx), and as for the control signals, the Tx 5V and Clock signals run in one direction from the transmission module 12 (Tx) to the reception module 14 (Rx), the LOP and HPD signals run in one direction from the reception module 14 (Rx) to the transmission module 12 (Tx), and the Data signal runs in both directions.

Due to the above configuration, 4-bit TMDS signals are converted to optical signals by the transmission module 12 (Tx unit), which is a transceiver, and the optical signals are transmitted to the reception module 14 (Rx unit), which is a receiver, using four optical fiber cables. The reception module 14 restores the optical signals to TMDS signals and outputs the TMDS signals to the monitor 88. Here, a case is described where a fiber cable is used for each TMDS signal of the differential signal pairs, but it is also possible to reduce the number of fiber cables by multiplexing the TMDS signals using wavelength division multiplexing or time division multiplexing. A loss of power (LOP) signal that gives notification of the signal reception status of the reception module 14 is also included in these signals. In the present embodiment, the LOP signal is a high level when the reception module 14 is normally receiving the optical signals and becomes a binary level signal of a low level when the reception module 14 is not receiving the signals or when there is an abnormality in the reception.

The transmission module is disposed with a reset input end 37, for releasing the output-stop state of the optical signals, and the external power supply 43 for supplying power. Also, the reception module is disposed with the external power supply 83 for supplying power.

(Electrical Configuration of the Transmission Module)

Figure 4:
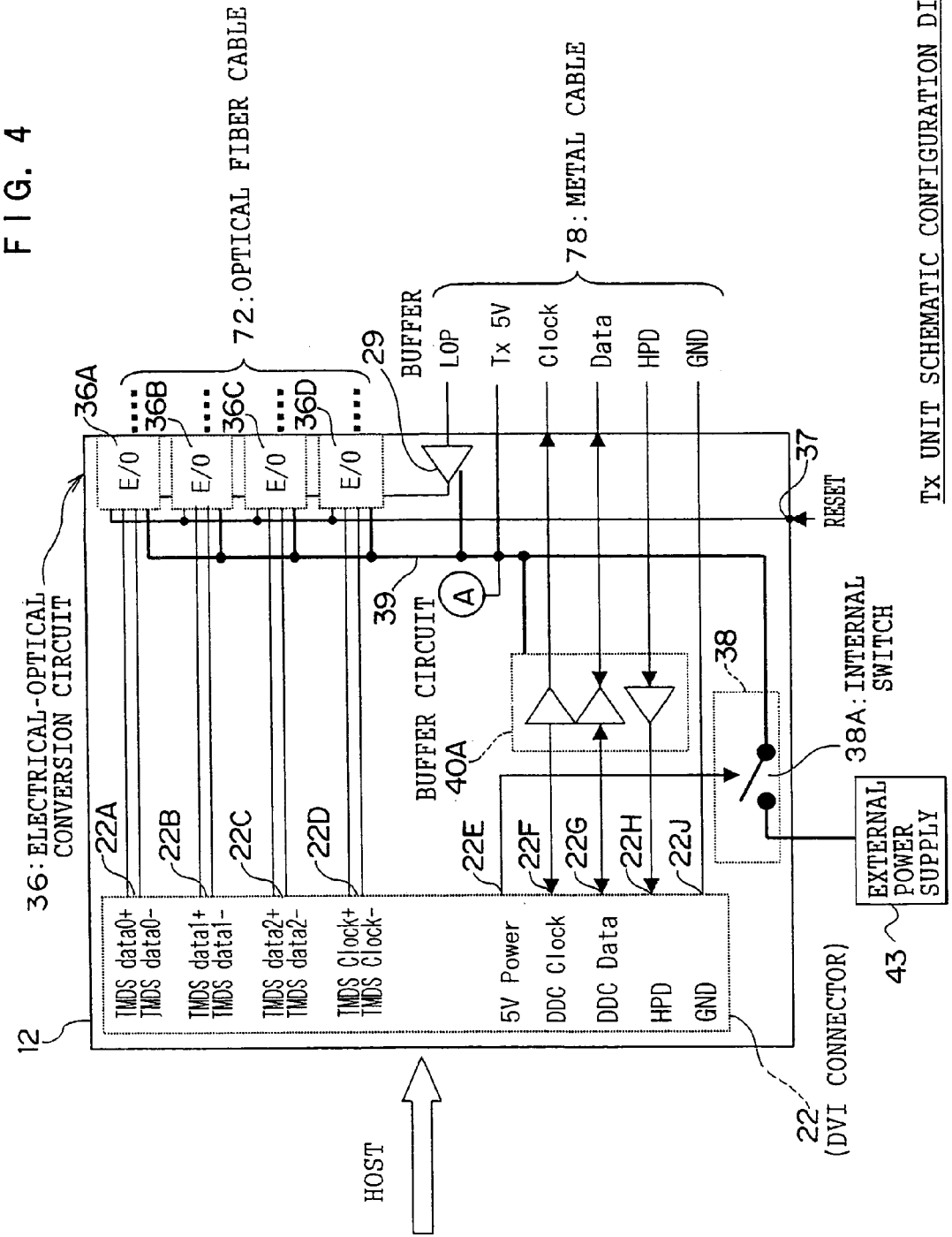
FIG. 4 is a diagram showing the schematic electrical configuration of a transmission module pertaining to a first embodiment of the invention.

FIG. 4 shows the schematic electrical configuration of the transmission module 12. The female electrical connector 22, which is a DVI connector of the transmission module 12, includes terminals 22A, 22B, 22C and 22D for the TMDS signals of the differential signal pairs. These terminals are connected to the electrical-optical conversion circuits 36A, 36B, 36C and 36D. The TMDS signals are converted to optical signals by the electrical-optical conversion circuit 36. Each of these electrical-optical conversion circuits 36A to 36D is connected to a power supply line 39 in order to receive the supply of power, and the power supply line 39 is connected to the external power supply 43 via an internal switch 38A internally housed in the power supply circuit 38. A terminal 22E for the 5V Power signal of the control signals other than the TMDS signals of the female electrical connector 22 is connected to the internal switch 38A. The female electrical connector 22 also includes terminals 22F, 22G, 22H and 22J for the control signals (DDC Clock, DDC Data, HPD and GND) other than the TMDS signals.

Thus, when the 5V Power signal, which is a startup signal outputted as a result of the host computer 86 starting up, is supplied (e.g., when the signal becomes a high level), the internal switch 38A becomes electrically continuous so that the external power supply 43 and the power supply line 39 are connected and the power from the external power supply 43 is supplied to the power supply line 39. When the 5V Power signal is not supplied as a result of the operation of the host computer 86 shutting down (e.g., when the signal becomes a low level), the internal switch 38A becomes electrically discontinuous so that the external power supply 38 and the power supply line 39 are not connected and the supply of power to the power supply line 39 is cut off.

Namely, the external power supply 43 is configured to supply power to the inside of the transmission module 12 via the internal switch 38A. That which controls the internal switch 38A is the 5V Power level signal that the host computer 86 outputs, so that the transmission module 12 is turned ON in association with the power of the host computer 86 being turned ON. The signal lines transmitted by the metal cable 78 may be directly connected as is, but when the cable length is long, it is preferable to insert a buffer resulting from a buffer circuit 40A. In the present embodiment, a case will be described where a buffer is inserted.

Also, the electrical-optical conversion circuits 36A to 36D are disposed with terminals that instruct input of a return to the initial state. These terminals are connected to the reset-input end 37. An instruction device such as a reset switch that outputs a reset signal as a result of being pushed is connected to the reset input end 37.

Also, the electrical-optical conversion circuits 36A to 36D are disposed with terminals that receive the input of the LOP signal from the reception module 14. These terminals are connected so that the LOP signal from the reception module 14 is inputted via a buffer 29. The buffer 29 is connected to the power supply line 39 in order to receive the supply of power.

The LOP signal is transferred by the metal cable 78, and among other signals transferred by the metal cable 78, there are the Tx 5V signal, the Clock signal, the Data signal, the HPD signal and the GND signal. The Tx 5V signal is used as a signal representing the power supply status when the power supply of the external power supply is effected by the electrical continuity of the internal switch 38A resulting from the 5V Power signal by connecting the signal terminals to the power supply line 39. It also serves as a signal representing the cutting off of the power supply from the external power supply 43 as a result of the 5V Power signal not being supplied. The Clock signal is a signal where the DDC Clock signal outputted from the terminal 22F is outputted via the corresponding buffer inside the buffer circuit 40A internally housed in the electrical signal transmission circuit 40. Similarly, the Data signal is a signal where the DDC Data signal outputted from the terminal 22G is outputted via the corresponding buffer inside the buffer circuit 40A. The HPD signal is a signal that is outputted from the reception module 14 and inputted to the terminal 22H for HPD via the corresponding buffer inside the buffer circuit 40A. The GND signal is connected as is to the metal cable 78. The buffer circuit 40A of the electrical signal transmission circuit 40 is connected to the power supply line 39 in order to receive the supply of power.

An LED (indicated by the encircled letter "A" in the drawing) is connected to the power supply line 39 and can be controlled to light up during operation.

(Electrical Configuration of the Electrical-Optical Conversion Circuit)

Figure 5:
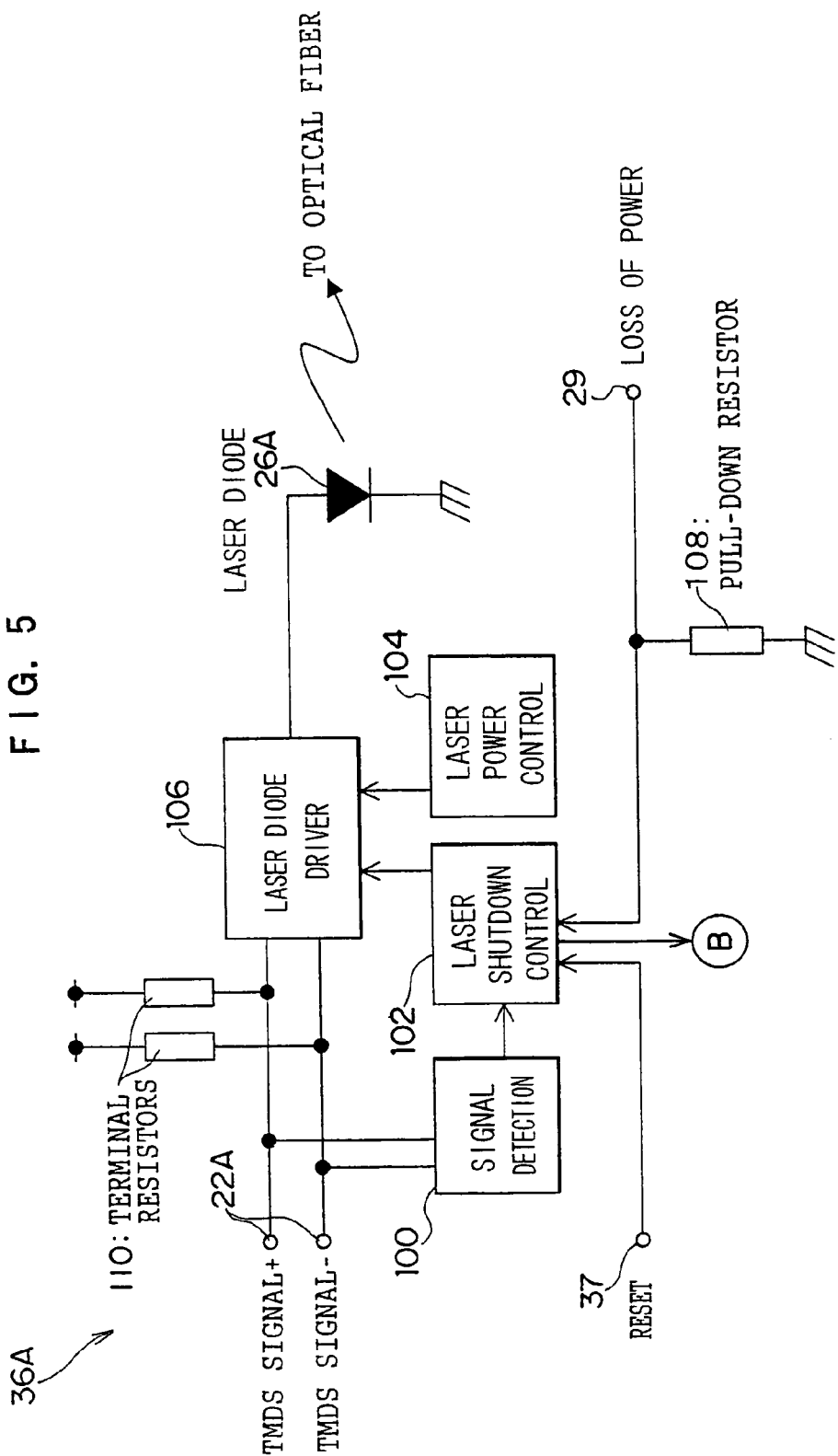
FIG. 5 is a diagram showing the basic conceptual configuration of an electrical-optical conversion circuit.

FIG. 5 shows the basic schematic configuration of the electrical-optical conversion circuit 36A. Here, the electrical-optical conversion circuit 36A will be representatively described, but the configurations of the other electrical-optical conversion circuits 36B to 36D are the same as that of the electrical-optical conversion circuit 36A. The electrical-optical conversion circuit 36A is disposed with a TMDS signal detector 100, a laser shutdown controller 102, a laser light amount controller 104 and a laser diode driver 106.

A laser diode 26 (26A) corresponding to the TMDS signals of the terminals 22A is connected to the output side of the laser diode driver 106. The terminals 22A for the TMDS signals are connected to a signal input side of the laser diode driver 106. The signal lines between the signal input side of the laser diode driver 106 and the terminals 22A are connected to the power supply via terminal resistors 110 and are connected to an input side of the TMDS signal detector 100. The output sides of the laser shutdown controller 102 and the laser light amount controller 104 are connected to a control signal input side of the laser diode driver 106. An output side of the TMDS signal detector 100 and output sides of the reset input end 37 and the buffer 29 that outputs the LOP signal are connected to an input side of the laser shutdown controller 102. The signal line between the input side of the laser shutdown controller 102 and the output side of the buffer 29 that outputs the LOP signal is connected via a pull-down resistor 108.

In the electrical-optical conversion circuit 36A, the laser diode driver 106 is driven by the TMDS signals, and a drive current is supplied to the laser diode 26A. The laser light amount controller 104 is for controlling the laser light amount so that the light emission amount becomes a predetermined light amount without fluctuating due to the surrounding temperature and element characteristics. Thus, the laser diode 26A lights up and off in accordance with the inputted TMDS signals. The lighting of the laser diode 26A can be forcibly stopped by the laser shutdown controller 102. Namely, the laser shutdown controller 102 can control the laser diode driver 106 so that the emission light of the laser diode 26A is forcibly stopped with a signal from the TMDS signal detector 100 or the reception status signal (LOP signal) from the reception module 14.

The operation of the laser shutdown controller 102 will be described. When, for example, the host computer 86 is outputting the TMDS signals and the LOP signal is a low level, the laser shutdown controller 102 controls the laser diode driver 106 in order to immediately stop the laser diode 26A. This is a case where, regardless of the fact that optical signals are being outputted in accordance with the output of the TMDS signals, the LOP signal is returned at a low level without the optical signals reaching the reception module 14. For this reason, in this case, it is assumed that the optical signals have not reached the reception module 14 due to some kind of trouble, and there is the potential for the laser light to be leaking to the outside of the device. Thus, the light emission of the laser diode 26A is stopped in consideration of the safety of the user.

A state where the TMDS signals are not being outputted from the host computer 86 indicates that the LOP signal is in principle a low level, i.e., that the optical signals are not reaching the reception module 14. When the output of the TMDS signals is initiated from this state, the LOP signal is returned at a low level, whereby the forced shutdown of the light emission of the laser diode 26A is maintained and the output of the TMDS signals by the optical signals cannot be done. In order to eliminate this, the LOP signal is temporarily monitored and the laser diode 26A is caused to emit light for a predetermined time necessary for the establishment of communication in a case where the state where the TMDS signals are not being outputted from the host computer 86 has shifted to the start state of the TMDS signal output when the LOP signal is a low level. Thus, output of the TMDS signals by the optical signals becomes possible.

By "predetermined time necessary for establishment of communication" is meant an amount of time equal to or greater than that sufficient for the LOP signal to be transmitted to the transmission module 12 when the laser diode 26A begins emitting light and the reception module 14 receives the optical signals and the LOP signal becomes a high level, and an amount of time equal to or less than that in which the laser light must be stopped when there is light leakage, which time is determined by laser safety standards. As a specific configuration for temporarily monitoring the LOP signal, the laser shutdown controller 102 may be disposed with a high level setter that temporarily resets the level of the LOP signal to a high level when, for example, the TMDS signals begin to be inputted, and a time-controllable delay circuit that maintains the state where the LOP signal has been temporarily reset to a high level. The delay circuit is controlled so that the laser shutdown controller 102 functions as a safety circuit during the time from when the level of the LOP signal is temporarily reset to a high level when the TMDS signals begin to be inputted to until the level of the LOP signal is again reflected after the reset, i.e., a time predetermined by experiment or calculation.

The TMDS signal detector 100 is for monitoring one of the 4-bit TMDS signals and detects whether or not a signal significant as image information is being outputted from the host computer 86. This can be realized by, for example, disposing the TMDS signal detector 100 with a peak hold circuit and comparing the voltage amplitude of the signal obtained by the peak hold circuit with a predetermined threshold. An example of the predetermined threshold is a value where the voltage amplitude in a case where a significant signal including image information is outputted from the host computer 86 is statistically predetermined by experiment or calculation.

As another example of the TMDS signal detector 100, a clock extraction function used in high-speed serial transmission can be used. Assuming that, in a case where there is a signal significant as image information, a clock of a predetermined period is embedded in the TMDS signal, the fact that a significant signal is coming when the clock component embedded in the TMDS signal can be determined and detected. Namely, this can be realized by disposing an extraction circuit that extracts the clock component from the TMDS signal and determining whether or not the signal obtained by the extraction circuit is a clock or comparing the period of the clock signal obtained by the extraction circuit with a predetermined period. An example of the predetermined threshold is a value where, in a case in which the clock period embedded in the TMDS signal is extracted when there is a signal significant as image information, a clock period of an allowed range is statistically predetermined by experiment or calculation.

With respect to the transmission line of the LOP signal, there is the potential for the level to become unstable when the metal cable 78 is not connected or is cut. In this manner, even in a case where proper notification of the LOP signal cannot be given, the level of the LOP input portion of the laser shutdown controller 102 can be forcibly established to a level where the laser diode 26A does not emit light so that the laser light is not emitted from the transmission module 12. In the present embodiment, because the LOP signal becomes a high level in an optical signal reception state, the pull-down resistor 108 is added to the inside of the transmission module 12, i.e., to the signal line between the buffer 29 and the laser shutdown controller 102. A pull-up resistor to a high level may be added in a case where the LOP signal has opposite characteristics.

An LED (indicated by the encircled letter "B" in the drawing) is connected to the laser shutdown controller 102. The laser shutdown controller 102 can control the LED so that the LED lights up when the transmission module 12 is not operating properly or when there is poor signal transmission.

(Electrical Configuration of the Reception Module)

Figure 6:
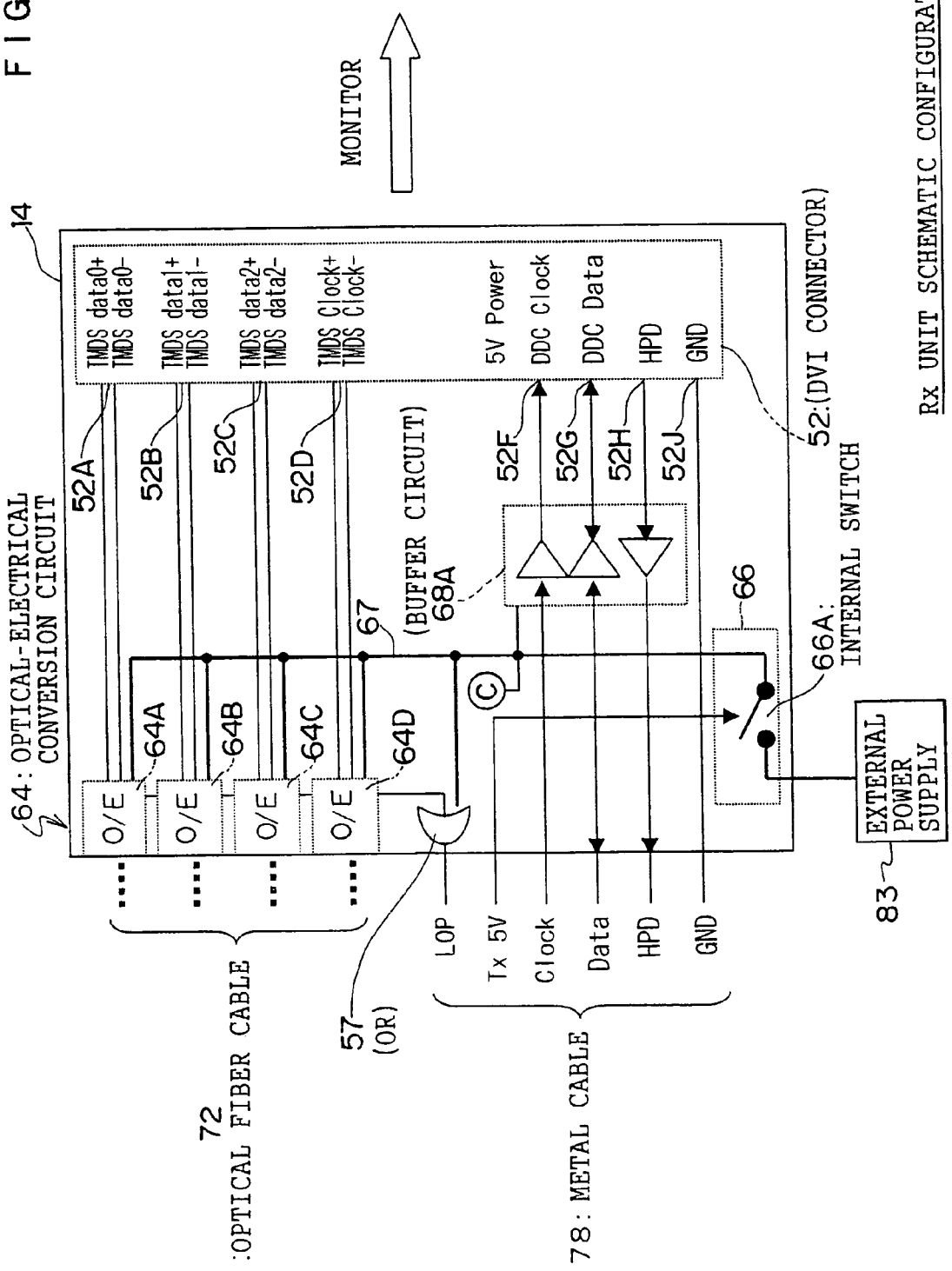
FIG. 6 is a diagram showing the schematic electrical configuration of a reception module.

FIG. 6 shows the schematic electrical configuration of the reception module 14. The female electrical connector 52, which is a DVI connector of the reception module 14, includes terminals 52A, 52B, 52C and 52D for the TMDS signals of the differential signal pairs. These terminals are connected to the optical-electrical conversion circuits 64A, 64B, 64C and 64D. Each of these optical-electrical conversion circuits 64A to 64D is connected to a power supply line 67 in order to receive the supply of power, and the power supply line 67 is connected to the external power supply 83 via an internal switch 66A internally housed in the power supply circuit 66. The operation of the internal switch 66A is controlled by a Tx 5V signal of the control signals other than the TMDS signals inputted via the metal cable 78.

Namely, when the Tx 5V signal is supplied (e.g., when the signal becomes a high level), the internal switch 66A becomes electrically continuous so that the external power supply 83 and the power supply line 67 are connected and the power from the external power supply 83 is supplied to the power supply line 67. When the Tx 5V signal is not supplied (e.g., when the signal becomes a low level), the internal switch 66A becomes electrically discontinuous so the supply of power to the power supply line 67 is cut off.

Namely, similar to the transmission module 12, the external power supply 83 supplies power to the reception module 14 via the internal switch 66A, but when the transmission module 12 starts up, the reception module 14 transmits the high-level signal (Tx 5V signal) through the metal cable 78 and uses this as a trigger. This is so that, by giving the reception module 14 this configuration because a maximum consumption current of the 5V Power of the host is assumed, excessive consumption during long-distance cable transmission is eliminated. Also, because it is not necessary to start the reception module 14 when, for example, some kind of trouble occurs in the transmission module 12, it suffices for the reception module 14 to be associated with the startup of the transmission module 12 and not the host computer 86.

Also, the optical-electrical conversion circuits 64A to 64D are disposed with an OR element 57 for outputting the LOP signal towards the transmission module 12. The LOP signal, which is an output signal of the OR element 57, is outputted to the transmission module 12 via the metal cable 78. An input side of the OR element 57 is connected to each of the optical-electrical conversion circuits 64A to 64D. The OR element 57 is connected to the power supply line 67 in order to receive the supply of power.

As for the configuration with respect to other signals transferred by the metal cable 78, similar to the transmission module 12, the Clock signal is a signal outputted to a terminal 52F for the DDC Clock signal via a corresponding buffer inside a buffer circuit 68A internally housed in the electrical signal reception circuit 68, and the Data signal is similarly a signal outputted to a terminal 52G for the DDC Data signal via a corresponding buffer inside the buffer circuit 68A. The HPD signal is a signal where the HPD signal outputted from a terminal 52H is outputted via a corresponding buffer inside the buffer circuit 68. The GND signal is connected as is to the metal cable 78. The buffer circuit 68A of the electrical signal reception circuit 68 is connected to the power supply line 67 in order to receive the supply of power.

An LED (indicated by the encircled letter "C" in the drawing) is connected to the power supply line 67 and can be controlled to light up during operation.

(Electrical Configuration of the Optical-Electrical Conversion Circuit)

Figure 7:
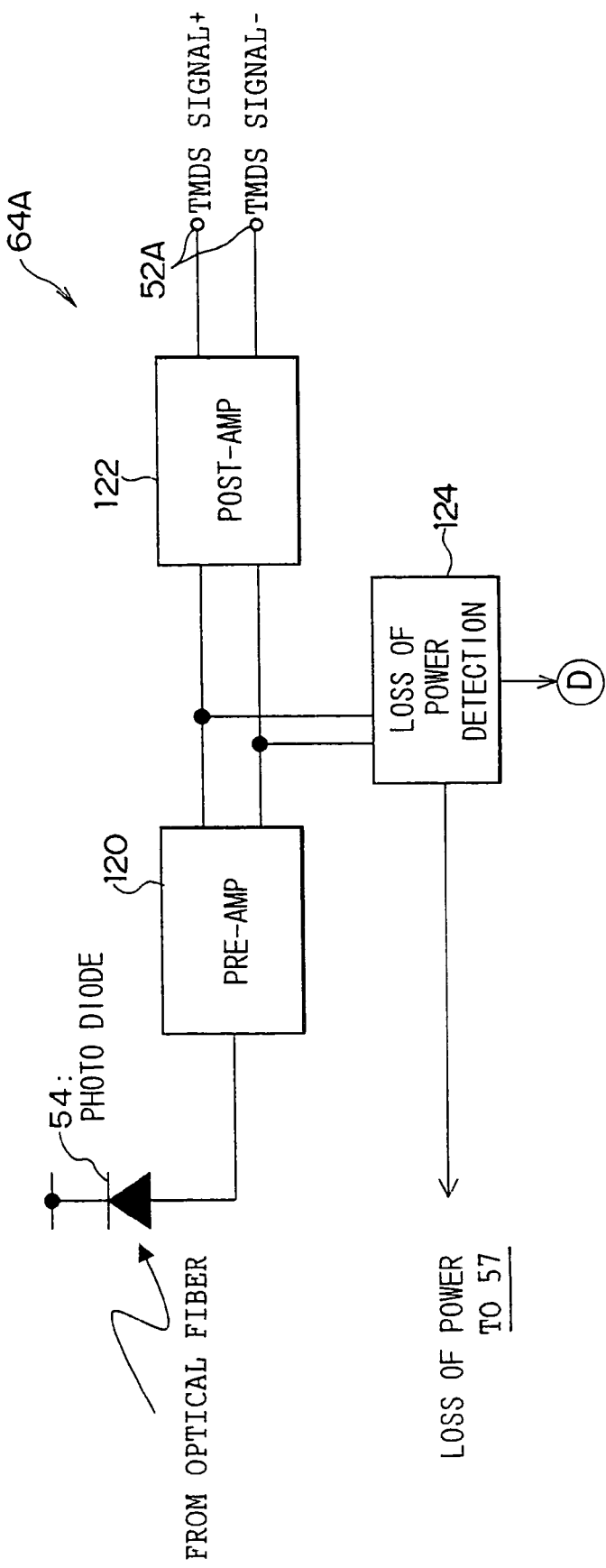
FIG. 7 is a diagram showing the basic conceptual configuration of an optical-electrical conversion circuit.

FIG. 7 shows the basic conceptual configuration of the electrical-optical conversion circuit 64A. Here, the optical-electrical conversion circuit 64A will be representatively described, but the configurations of the other optical-electrical conversion circuits 64B to 64D are the same as that of the optical-electrical conversion circuit 64A. The optical-electrical conversion circuit 64A is disposed with a pre-amp 120, a post-amp 122 and a light amount monitor signal detector 124. An input side of the pre-amp 120 is connected to the corresponding photodiode 54 (54A). An output side of the pre-amp 120 is connected to terminals 52A for the TMDS signals via the post-amp 122, and is also connected to a signal input side of the light amount monitor signal detector 124. An output side of the light amount monitor signal detector 124 is connected to the input side of the OR element 57 for output as the LOP signal.

In the optical-electrical conversion circuit 64A, the optical signals transmitted by the optical fiber cable 72 are converted to TMDS format electrical signals. First, an optical current generated by the photodiode 54 (PD) is current-voltage-transduced by the pre-amp 120. The output voltage amplitude at this time is proportional to the amount of light made incident. For this reason, the arrival status of the optical signals can be monitored from the output of the pre-amp 120. Because the light amount monitor signal detector 124 of the present embodiment is for monitoring the arrival status of the optical signals, it detects whether or not the optical signals from the transmission module 12 have arrived and outputs the result as the LOP signal. Specifically, this can be realized by, for example, disposing the light amount monitor signal detector 124 with a peak hold circuit and comparing the voltage amplitude of the signal obtained by the peak hold circuit with a predetermined threshold. For example, the LOP can be made into a low level when the amplitude of the peak hold circuit does not exceed a predetermined threshold, and the LOP signal can be made into a high level when the amplitude of the peak hold circuit exceeds a predetermined threshold. An example of the predetermined threshold is a value where the voltage amplitude of the light amount in which the optical signals outputted from the transmission module 12 are made incident at the photodiode 54 is statistically determined by predetermined by experiment or calculation.

In the present embodiment, plural differential signal pairs are used as the TMDS signals. There is the potential for some kind of trouble to have arisen if even one of the plural optical signals corresponding to these plural differential signal pairs cannot be received. Thus, in the present embodiment, an OR resulting from the OR element 57 of the LOP signal outputted from the optical-electrical conversion circuits 64 is transmitted to the transmission module 12 as the LOP signal in order for it to be recognized that some kind of trouble has arisen when even one of the plural optical signals cannot be received. Thus, the transmission module 12 can be notified of the LOP signal.

Also, an LED (indicated by the encircled "D" in the drawing) is connected to the light amount monitor signal detector 124. The light amount monitor signal detector 124 can control the LED so that the LED lights up when the optical signals are not arriving properly.

The electrical-optical conversion circuit 36 of the present embodiment corresponds to an electrical-optical conversion unit of the invention, and the electrical signal transmission circuit board 20 corresponds to a transmission-side electrical signal input and output unit of the invention. Also, the TMDS signal detector 100 of the present embodiment corresponds to a transmission-side detection unit of the invention, the laser shutdown controller 102 corresponds to a control unit of the invention, and the buffer 29 corresponds to a receiving unit of the invention. Also, the reset input end 37 corresponds to a reset input unit of the invention, and the internal switch 38A corresponds to a switch unit of the invention.

Also, the optical-electrical conversion circuit 64 of the present embodiment corresponds to an optical-electrical conversion unit of the invention, and the electrical signal reception circuit board 50 corresponds to a reception-side electrical signal input and output unit of the invention. Also, the light amount monitor signal detector 124 of the present embodiment corresponds to a reception-side detection unit of the invention. Also, the pre-amp 120 corresponds to a pre-amp of the invention, and the internal switch 66A corresponds to a reception-side switch of the invention.

(Action)

Next, the action of the present embodiment will be described. When the image signal and the image control signal (both electrical signals) are inputted to the transmission module 12 from the host computer 86, the image signal is converted to an optical signal by the electrical-optical conversion circuit board 18 and transmitted to the reception module 14 via the optical fiber cable 72, and the image control signal is transmitted and received between the transmission module 12 and the reception module 14 via the electrical signal transmission circuit board 20 and the metal cable 78. In the reception module 14, the optical signal (image signal) is converted to an electrical signal by the optical-electrical conversion circuit 64, the electrical signal (image signal) is transmitted to the monitor 88 via the image signal cable 56, and the image control signal is transmitted to the monitor 88 via the electrical signal reception circuit 68 and the image signal cable 56.

In terms of the directions of the signals between the transmission module 12 and the reception module 14, the TMDS signals run in one direction from the transmission module 12 (Tx) to the reception module 14 (Rx), and as for the control signals, the Tx 5V and Clock signals run in one direction from the transmission module 12 (Tx) to the reception module 14 (Rx), the LOP and HPD signals run in one direction from the reception module 14 (Rx) to the transmission module 12 (Tx), and the Data signal runs in both directions.

Figure 8:
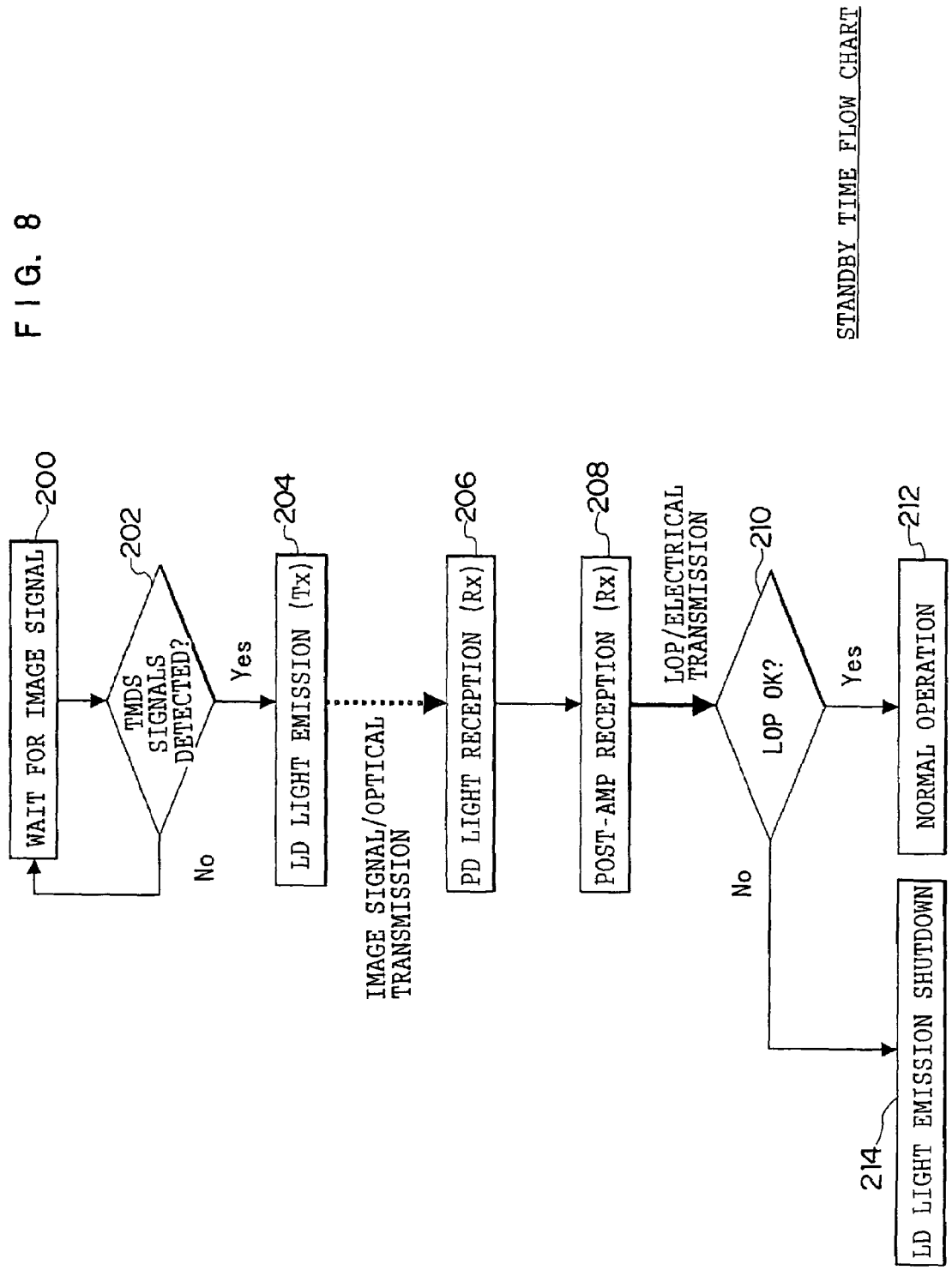
FIG. 8 is a flow chart showing the flow of an operation in a standby state of the optical transmission device pertaining to the first embodiment of the invention.
Figure 9:
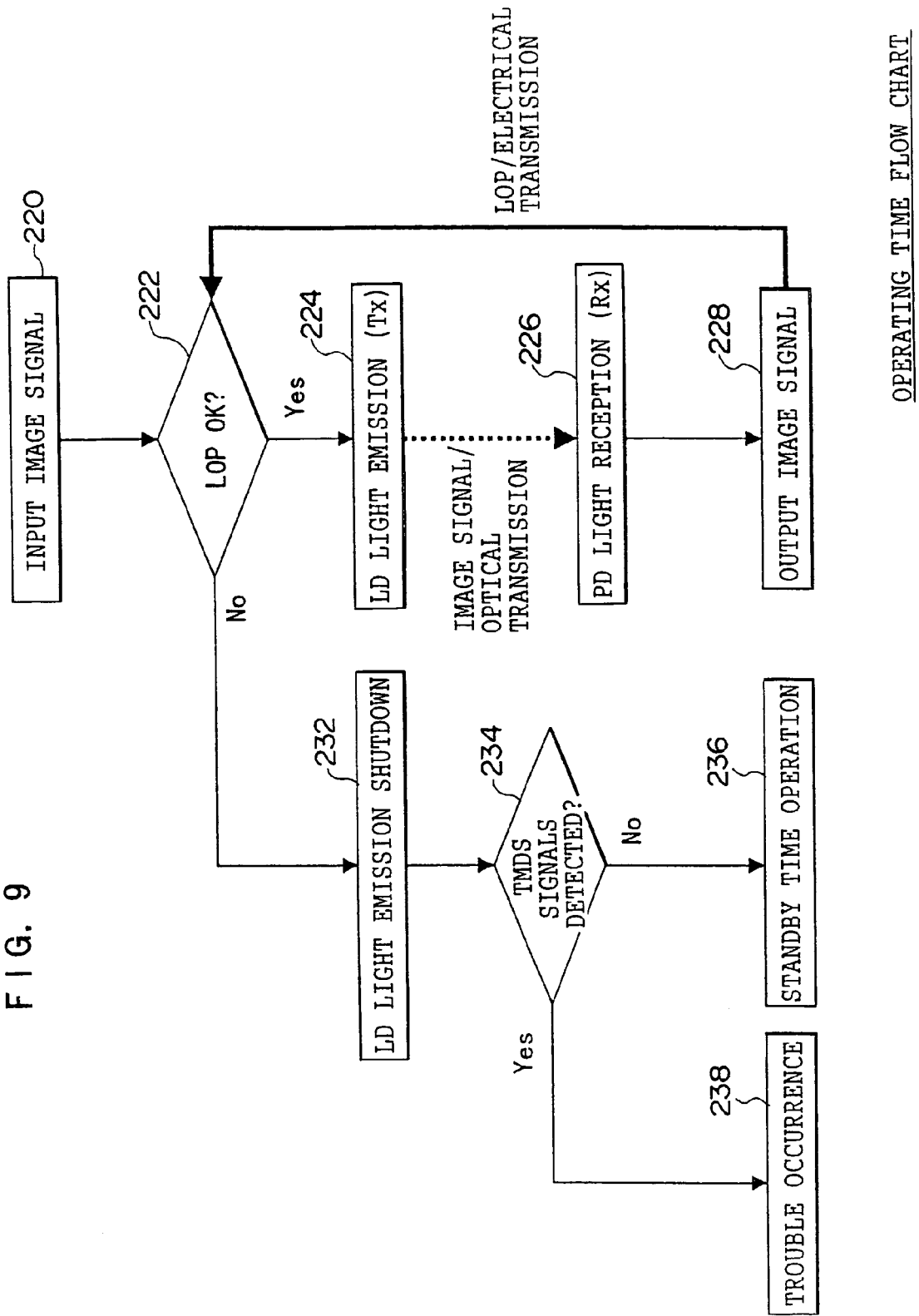
FIG. 9 is a flow chart showing the flow of an operation in an operating state of the optical transmission device pertaining to the first embodiment of the invention.

The detailed operation of the optical transmission device 10 will be described with reference to the drawings. Here, a standby state and an operating state of the optical transmission device 10 will be described. FIG. 8 shows the flow of the operation of the optical transmission device 10 in the standby state. FIG. 9 shows the flow of the operation of the optical transmission device 10 in the operating state. By "standby state" is meant a state where the host computer 86 is ON but image signals are not being outputted. By "operating state" is meant a state where the host computer 86 is turned ON and image signals are outputted.

Referring now to FIG. 8, in the standby state, first, in step 200, the optical transmission device 10 stands by until an image signal is outputted from the host computer 86 (a negative determination is repeated in step 202 until affirmative). At this time, the LOP signal is a low level because optical signals are not being outputted. Namely, the light amount monitor signal detector 124 detects the low-level LOP signal and the laser shutdown controller 102 receives this, whereby the laser shutdown controller 102 controls the laser diode driver 106 in order to stop the light emission of the laser diode 26.

Next, when the TMDS signals are outputted from the host computer 86, the signals are detected in the TMDS signal detector 100, and the TMDS signal detector 100 outputs, to the laser shutdown controller 102, a release signal for releasing the shutdown of the light emission of the laser diode 26. Thus, even if the LOP signal is a low level, the laser diode 26 is forcibly caused to emit light for a time necessary for at least communication to be established, as described above (step 204).

In step 204, when the laser diode 26 emits light, the reception module 14 receives the optical signal. Specifically, the photodiode 54 receives the light (step 206), and the pre-amp 120 amplifies the output signal of the photodiode 54 in accordance with the amount of received light and outputs the output signal to the post-amp 122. The post-amp 122 receives this and outputs TMDS signals amplified for output signals (step 208). Similar to the reception of the post-amp 122, the light amount monitor signal detector 124 monitors the arrival status of the optical signals from the output of the pre-amp 120, detects whether or not the optical signals from the transmission module have arrived, and moves the LOP signal to a high level and outputs the high-level LOP signal when the optical signals have arrived from the transmission module 12.

The laser shutdown controller 102 of the transmission module 12 determines whether or not the LOP signal has moved to a high level after the light emission of the laser diode 26 (step 210). When the LOP signal has moved to a high level (YES in step 210), then normal operation can be continued (step 212). If the LOP signal is still a low level (NO in step 210), it is recognized that there is some kind of trouble, and the laser shutdown controller 102 controls the laser diode driver 106 to shut down the light emission of the laser diode 26 in order to shut down the light emission of the laser diode 26 for safety reasons (step 214).

Referring now to FIG. 9, in the operating state, first in step 220, the image signal outputted from the host computer 86 is inputted. At this time, the light amount monitor signal detector 124 always monitors the arrival status of the optical signals and outputs the LOP signal. The laser shutdown controller 102 always monitors the LOP signal, and when the LOP signal is a high level (YES in step 222), the operation of the reception module 12 is continued. Namely, the laser diode driver 106 causes the laser diode 26 to emit light (step 224). The photodiode 54 receives the optical signals resulting from the light emission of the laser diode 26 (step 226), and the post-amp outputs image signals as the TMDS signals (step 228).

When the LOP signal has moved to a low level (NO in step 222), the laser shutdown controller 102 controls the laser diode driver 106 in order to shut down the light emission of the laser diode 26 (step 232). At this time, the laser shutdown controller 102 detects the signals from the TMDS signal detector 100. When the result of the determination by the TMDS signal detector 100 is that the TMDS signals are not being outputted (NO in step 234), the optical transmission device 10 moves to the standby state (processing of FIG. 8) as an image signal stop by the host computer 86 (step 236).

When the result of the determination by the TMDS signal detector 100 is that the TMDS signals are being continuously outputted (YES in step 234), the laser shutdown controller 102 determines that trouble has arisen due to some reason in the transmission between the transmission module 12 and the reception module 14, recognizes the occurrence of trouble, and moves to trouble occurrence processing (step 238). In this trouble occurrence processing, a warning is issued by causing an alarm LED to light up or causing a warning sound to sound.

Figure 10:
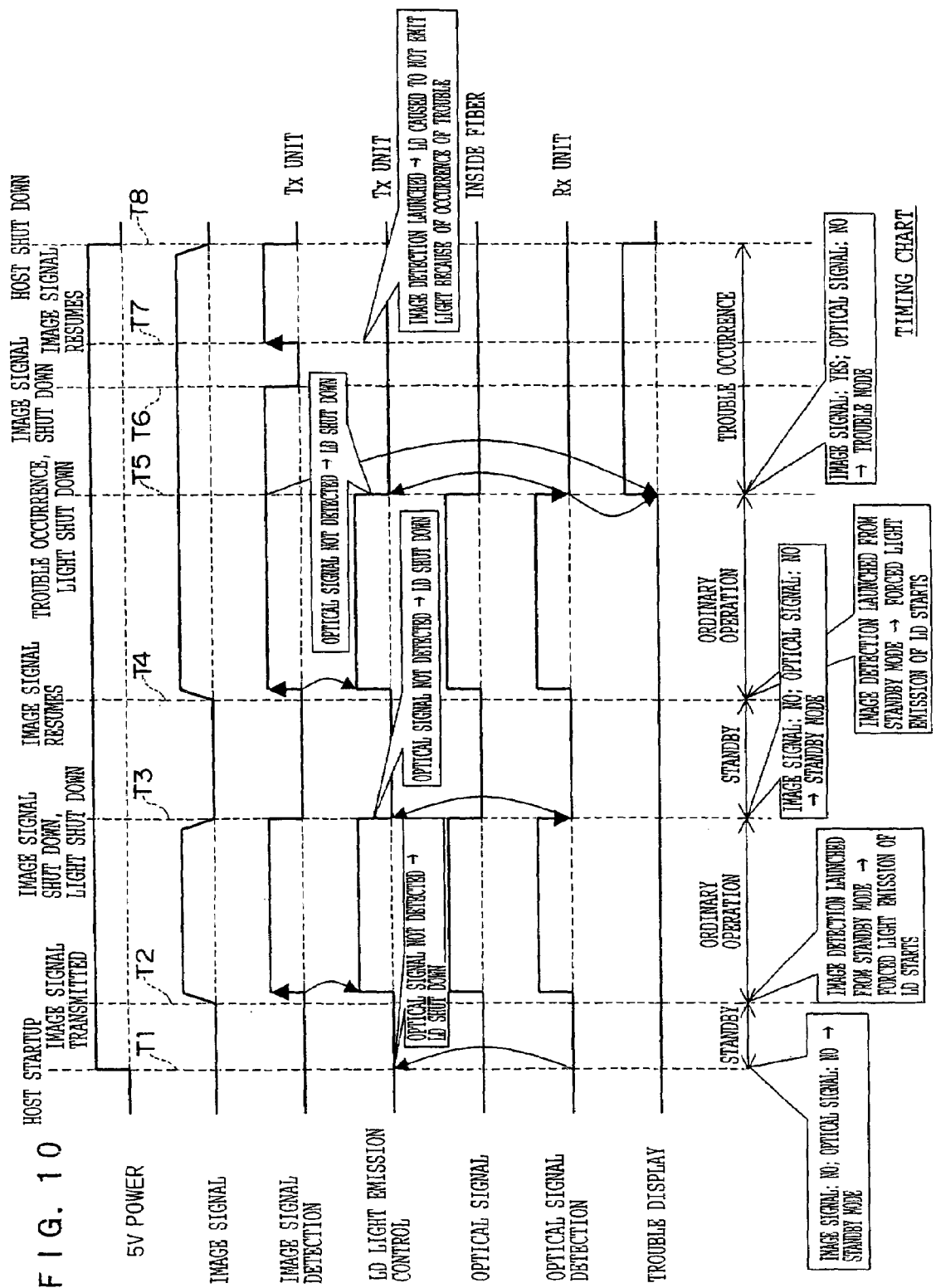
FIG. 10 is a timing chart showing the flow of a mixed environment of the standby state and the operating state of the optical transmission device.
Figure 11:
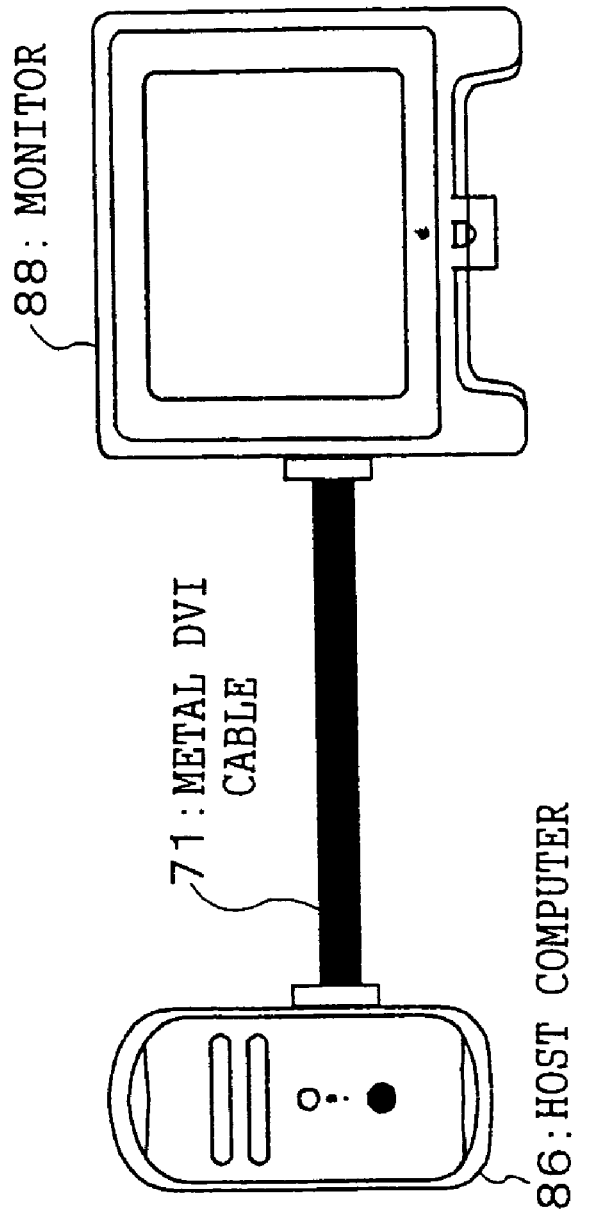
FIG. 11 is a schematic configural diagram showing a conventional system in which a host computer and a monitor are connected by a conventional metal DVI cable.
Figure 12:
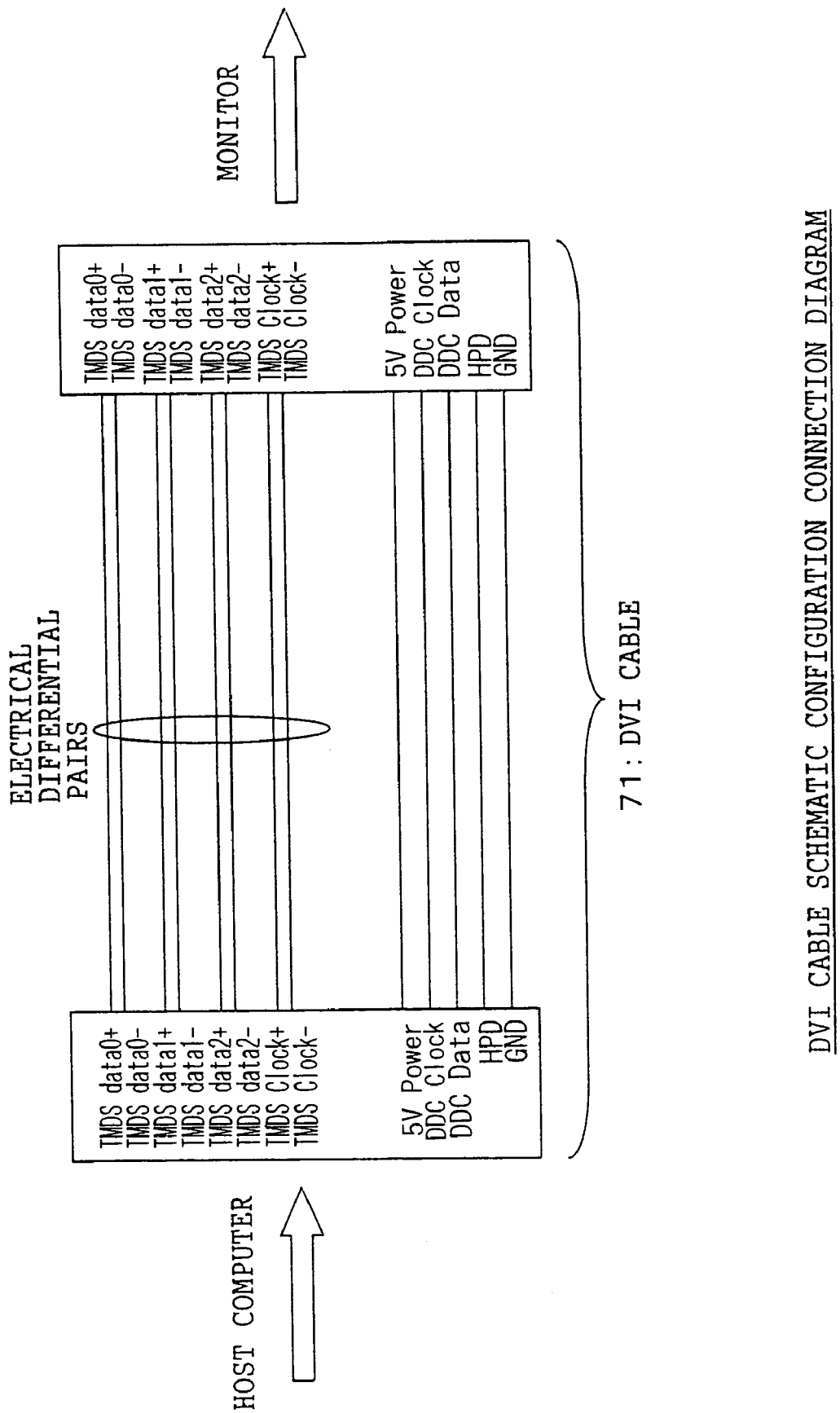
FIG. 12 is a schematic configural diagram showing the conventional metal DVI cable.

FIG. 10 is a diagram where the flow of a mixed environment of the standby state and the operating state is represented by a timing chart.

At the time T1, when the host computer 86 starts up, the 5V Power signal becomes a high level and the internal switch 38A becomes electrically continuous. Thus, power is supplied from the external power supplies to the transmission module 12 and the reception module 14, and the optical transmission device 10 becomes operable. In this case, the optical transmission device 10 is in the standby state because the image signal is not being outputted and the optical signal is not reaching the reception module 14.

At the time T2, when the output of the image signal from the host computer 86 begins, the TMDS signal detector 100 detects this and outputs, to the laser shutdown controller 102, the release signal for releasing the shutdown of the optical signal. Thus, the laser shutdown controller 102 controls the laser diode driver 106 so as to forcibly cause the laser diode 26 to temporarily emit light, without relation to whether or not the optical signal has reached the reception module 14. In this case, the optical transmission device 10 is in the operating state. At this time, as described above, the laser shutdown controller 102 controls the laser diode driver 106 to shut down the light emission of the laser diode 26 if the optical signal has not been returned within a time stipulated for laser safety, i.e., if the LOP signal has not moved to a high level.

At the time T3, when the output of the image signal from the host computer 86 is stopped, the light amount monitor signal detector 124 of the reception module 14 detects this, and the reception module 14 outputs the low-level LOP signal to the transmission module 12. The laser shutdown controller 102 of the transmission module 12 detects the fact that the reception module 14 is unable to detect the optical signal (the LOP signal is a low level), whereby it controls the laser diode driver 106 so that the light emission of the laser diode 26 is shut down. At this time, the fact that the image signal is not being outputted is detected by the TMDS signal detector 100, and the optical transmission device 10 moves to the standby state.

In the present embodiment, a case was described where, from the standpoint that the optical signal is necessarily shut down when the image information is stopped (when the image signal is a low level without being outputted) the output of the optical signal was shut down when the optical signal did not reach the reception module 14 (due to the level of the LOP signal), but the invention is not limited thereto. Namely, the invention is also applicable to a state only when the image signal is not outputted, to a state only when the optical signal does reach the reception module 14, or to both states where the optical signal does not reach the reception module 14 without the image signal being outputted. In particular, the state only when the image signal is not outputted is preferable from the standpoint of reduced energy consumption. For example, this becomes an individual state where the image is not outputted in a case where some kind of failure arises in the state where the image signal is not being outputted and the optical signal reaches the reception module 14 (abnormal arrival) or a case where an abnormality in the oscillation arises in a circuit in the system of the reception module 14 and it is erroneously recognized that the optical signal is arriving (erroneous operation). Thus, by stopping the output of the optical signal in this case also, quick handling of abnormal arrival and erroneous operation becomes possible. Also, in a case where time is required from when the image signal is stopped to when notification is given of the fact that the optical signal is not arriving, e.g., a case where it takes time for the image signal to be transmitted to the transmission side and return by the metal cable, efficient handling becomes possible due to the optical transmission device 10 standing by until the state where the optical signal is not arriving is detected.

At the time T4, when the output of the image signal from the host computer 86 begins, the optical transmission device 10 moves to the operating state similar to the aforementioned time T2. Namely, because the image signal detection moves from a low level to a high level in the standby state, the laser diode 26 is forcibly caused to emit light regardless of whether or not there is an optical signal. Then, the light emission of the laser diode 26 is shut down unless the arrival of the optical signal can be confirmed within a time stipulated for laser safety.

At the time T5, e.g., when the optical fiber cable 72 has been broken, the fact that the LOP signal is a low level because the arrival of the optical signal cannot be detected in the light amount monitor signal detector 124, i.e., the fact that the optical signal cannot be detected by the reception module 14 (the LOP signal is a low level) is detected, whereby the laser shutdown controller 102 controls the laser diode driver 106 to shut down the light emission of the laser diode 26. At this time, the optical transmission device 10 moves to the trouble occurrence state because it is detected by the TMDS signal detector 100 that the image signal is outputted. At this time, notification of the trouble occurrence is given by the LED.

At the time T6, when the output of the image signal from the host computer 86 is stopped, the optical transmission device 10 maintains the trouble occurrence state without moving to the standby state because it is in the middle of the trouble occurrence state.

At the time T7, when the output of the image signal from the host computer 86 has started, similar to the time T6, the optical transmission device 10 maintains the trouble occurrence state without controlling the light emission of the laser diode 26 because the optical transmission device 10 is in the middle of the trouble occurrence state.

At the time T8, when the host computer 86 stops, the 5V Power signal becomes a low level and the internal switch 38A becomes electrically discontinuous. Thus, the supply of power from the external power supplies to the transmission module 12 and the reception module 14 is cut off, and the operation stops.

In the trouble occurrence state, rapid restoration is preferable when the user discovers and removes the cause. Thus, in the present embodiment, the trouble occurrence state can be released by inputting the reset signal by pushing the reset switch. Namely, the function of temporarily forcing the laser diode 26 to emit light in the standby state at the same time that the trouble occurrence display is released by pushing the reset switch is added. Thus, an effect that is the same as when the output of the image signal starts can be added to the TMDS signal detector 100 during the standby state by pushing the reset switch.

In this manner, in the optical transmission device 10 of the present embodiment, even if external power supplies are connected to the optical transmission device 10, the power is supplied to each module (the transmission module 12 and the reception module 14) of the optical transmission device 10 in association with turning ON the power of the host computer 86, so that useless deterioration of the light source (laser diode 26) can be prevented and superfluous power consumption can be controlled.

Also, because detection of the image signal is conducted by both the reception module 14 (receiver) and the transmission module 12 (transceiver), the occurrence of trouble such as breakage of the optical fiber cable 72 can be accurately detected and the laser light can be immediately stopped.

Moreover, even if the signal is resumed from the state where the host computer 86 is not outputting the image signal during normal operation, this is not recognized as trouble occurrence, and transmission can be resumed.

Here, the point will be further described that power saving can be realized while ensuring the safety of the laser light by providing the signal transmission device of the present embodiment.

As shown in FIG. 13, in a semiconductor laser, there is a relationship between the light emission amount and the current flowing in the forward direction of the diode. From this relationship, it can be understood that the light amount also increases together with an increase in the current when laser light emission begins from when a certain threshold current Ith has been exceeded. When the drive current at the time of the low level is made equal to or less than the threshold current Ith when "1" of an electrical signal (digital transmission signal) is allocated to a high-level light amount and "0" is allocated to a low-level light amount by electrical-optical conversion, a delay arises in the rise of the light amount, which causes distortion of the pulse width and jittering of the signal.

Thus, a common drive method of a semiconductor laser always imparts a bias current Ib as the DC component, adds a current of half of a modulation current Im to the bias current when the digital transmission signal is "1", and subtracts half of the modulation current Im from the bias current when the digital transmission signal is "0". By using this configuration, the light from the semiconductor laser in the signal transmission state adopts a state of either a high-level light amount when (Ib+Im/2) is applied and a low-level light amount when (Ib−Im/2) is applied. In this case, the drive condition is set to satisfy the relation of Ith≦(Ib−Im/2) so that the low-level drive current does not fall below the threshold current.

When image information is applied to the electrical-optical conversion unit, high-level or low-level light emission is conducted because the electrical signal takes "0" or "1" of the digital level. However, when there is no image information, the modulation current goes away, and the semiconductor laser emits light only with the bias current Ib. This is called bias light emission. Incidentally, the intermediate values (average light amounts) of the light amount of the bias light emission, the high-level light amount and the low-level light amount become substantially equal. Namely, even if image information is not transmitted from the host, the average drive current per unit time flowing in the semiconductor laser is not different from that during image information transmission, without the average light emission amount per unit time of the laser becoming small. Thus, regardless of whether or not there is an image information signal, the current consumed by the semiconductor laser becomes constant.

For example, in technology where the power is turned ON in response to the startup of the host when the host and the monitor are in a normally connected state (e.g., see JP-A No. 2003-209920), when the host is ON, the semiconductor laser conducts substantially constant light emission regardless of whether or not there is image information. Thus, when there is no failure in a transmission path such as fiber and light is not leaking to the outside, reducing the power consumption is not desirable even though the safety of the laser can be ensured.

In contrast, according to the present embodiment, it becomes possible to stop the bias light emission when there is no signal, without relation to signal transmission, whereby it becomes possible to reduce superfluous current consumption by the transmission device. The effect of prolonging the life of the semiconductor laser can also be expected.

In the present embodiment, a case was described where an image signal was transmitted, but the invention is not limited to an image signal, can be used for an audio signals and another signal, and is not limited to the signal type.

Also, in the present embodiment, a case was described where plural optical signals were transmitted and received, but the invention is not limited to plural optical signals and may be used with only one optical signal.

Second Embodiment

Next, a second embodiment of the invention will be described in detail. The present embodiment is for further reducing power consumption in regard to the reception module 14. Because the present embodiment has a configuration that is substantially the same as that of the preceding embodiment, the same reference numerals will be given to the same portions, detailed description of those same portions will be omitted, and the different portions will be described below.

(Electrical Configuration of the Transmission Module)

Figure 14:
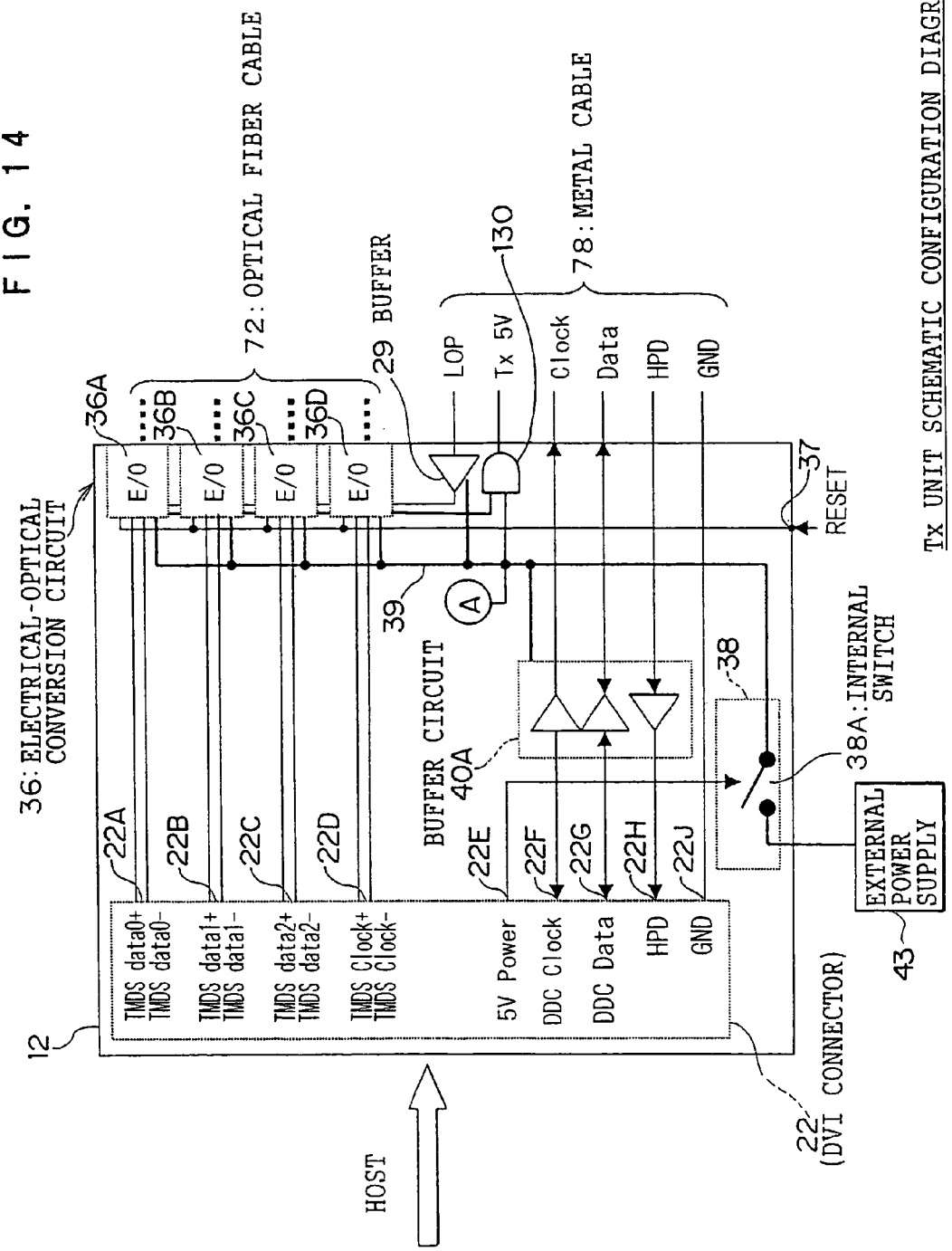
FIG. 14 is a block diagram showing the schematic electrical configuration of a transmission module pertaining to a second embodiment of the invention.

FIG. 14 shows the schematic electrical configuration of the transmission module 12 in the present embodiment. What is different from the configuration shown in FIG. 4 is that, here, a status output circuit 130 is added which outputs a Tx 5V signal used as a signal representing the power supply status when the external power supply 43 supplies power. The details will be described later, but an input side of the status output circuit 130 is connected to the electrical-optical conversion circuits 36A to 36D and the power supply line 39 for detecting the power supply. An output side of the status output circuit 130 is connected to an output end of the Tx 5V signal.

(Electrical Configuration of the Electrical-Optical Conversion Circuit)

Figure 15B:
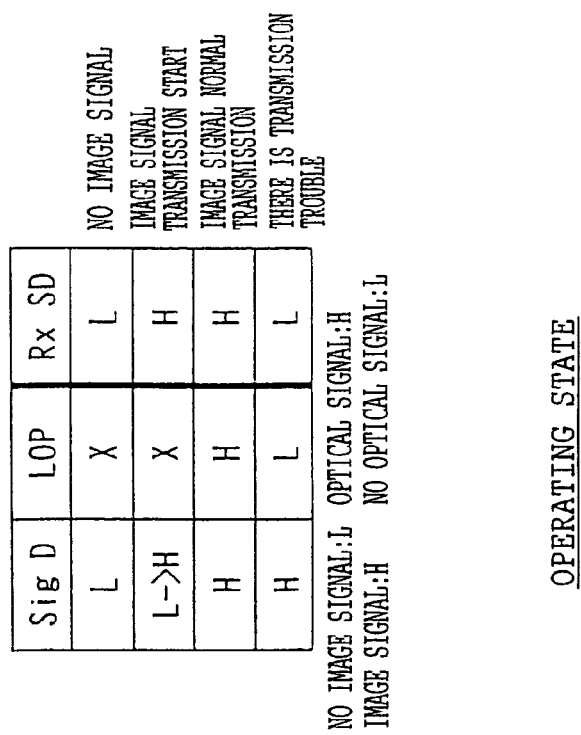
FIGS. 15A and 15B are explanatory diagrams showing a status output circuit pertaining to the second embodiment of the invention, with FIG. 15A showing main functional portions in the periphery of the status output circuit and FIG. 15B showing an operating state.
Figure 15A:
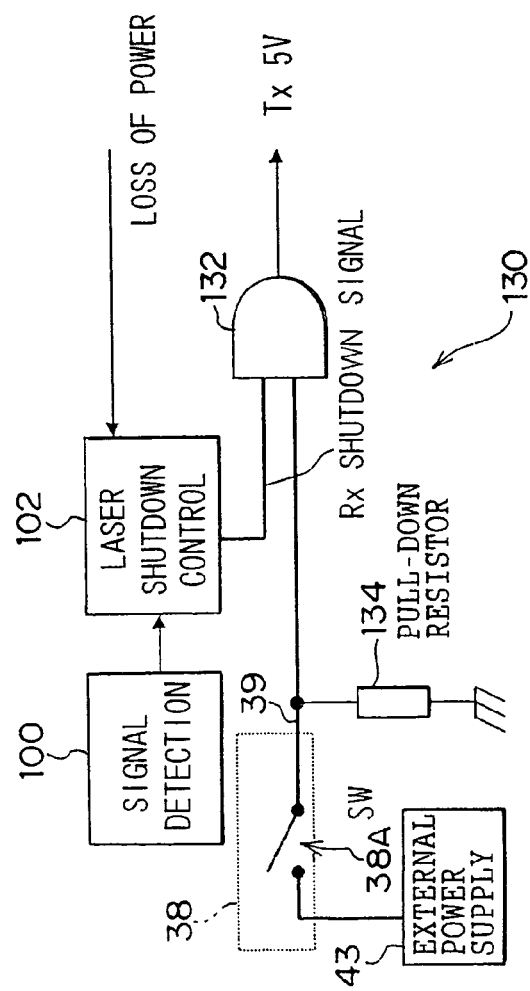

FIGS. 15A and 15B are explanatory diagrams of the status output circuit 130. FIG. 15A shows the main functional portions of the periphery of the status output circuit 130, and FIG. 15B shows an operating state. FIG. 15A shows portions (the TMDS signal detector 100, the laser shutdown controller 102) relating to the status output circuit 130 of the portions configuring the electrical-optical conversion circuit 36.

As shown in FIG. 15A, the output side of the TMDS signal detector 100 and the output side of the buffer 29 outputting the LOP signal are connected to the input side of the laser shutdown controller 102 configuring the electrical-optical conversion circuit 36. In the present embodiment, the laser shutdown controller 102 conducting shutdown control of the laser diode 26 has a configuration that outputs, to the status output circuit 130, a signal (Rx shutdown signal; called a "shutdown signal RxSD" below) for forcibly causing the reception module 14 to shut down (cut off the power supply) due to a signal from the TMDS signal detector 100 and a reception status signal (LOP signal) from the reception module 14.

In the present embodiment, the status output circuit 130 is configured by an AND element 132 that conducts an AND operation and a pull-down resistor 134. An input side of the AND element 132 is connected to the output side of the laser shutdown controller 102, i.e., the output end of the shutdown signal RxSD, and to the power supply line 39. The signal line between the input side of the AND element 132 and the power supply line 39 is grounded via the pull-down resistor 134. An output side of the AND element 132 is connected to the output end of the Tx 5V signal.

As shown in FIG. 15B, the operation of the laser shutdown controller 102 is determined by the statuses of the output signal of the TMDS signal detector 100 and the LOP signal. The TMDS signal detector 100 becomes a low level or a high level as a result of the detection and non-detection of the TMDS signals, which are image signals. The LOP signal becomes a low level or a high level depending on whether or not the optical signals have arrived. As a result, the shutdown signal RxSD becomes a low level where there is no image signal, becomes a high level when the transmission of the image signals start, becomes a high level when the image signals are being transmitted normally, and becomes a low level when there is poor transmission (there is transmission trouble).

Thus, the laser shutdown controller 102 makes the shutdown signal RxSD a low level in a state where the TMDS signals (image signals) are not being received, and makes the shutdown signal RxSD a high level in a state where the TMDS signals have been received. In this case, the LOP signal is ignored for a predetermined constant time.

The laser shutdown controller 102 makes the RxSD signal a high level when the TMDS signals (image signals) are being received and the LOP signal is also a high level. When the LOP signal moves to a low level from this state, the laser shutdown controller 102 makes the light emission shutdown signal RxSD a low level (at the same time as it causes the laser diode 26 to shut down).

By "predetermined constant time" is meant an amount of time equal to or greater than that sufficient for the optical transmission device 10 to move from a transmission standby state to a normal state (when the image signals are transmitted and the LOP signal is a high level), and an amount of time equal to or less than that in which the laser light must be stopped in the event there is light leakage by the stipulation of laser safety.

In this manner, in the present embodiment, the shutdown signal RxSD is outputted from the laser shutdown controller 102, the AND operation of the power supply state from the internal switch 38A, i.e., the state of the power supply line 39 is taken by the AND element 132, and the output signal of the AND element 132 is transmitted to the reception module 14 as the output of the Tx 5V via the metal cable 78. Thus, the reception module 14 is supplied with power when the result of the AND operation is a high level, and the supply of power is shut down when the result of the AND operation is a low level.

(Action)

Next, the action of the present embodiment will be described. Here, the standby state and the operating state of the optical transmission device 10 will be described. FIG. 16 shows the flow of the operation of the optical transmission device 10 in the standby state, and FIG. 17 shows the flow of the operation of the optical transmission device 10 in the operating state.

The flow in the standby state of the optical transmission device 10 shown in FIG. 16 is the same as the flow shown in FIG. 8, except that the processing of step 214 for stopping the light emission of the laser diode 26 is changed to a step 215 in which processing prompting power supply shutdown of the reception module 14 is added.

Thus, in the standby state, the light emission of the laser diode 26 is shut down for reasons of safety when it is recognized that there is some kind of trouble, and a signal prompting power supply shutdown of the reception module 14 is outputted.

The flow in the operating state of the optical transmission device 10 shown in FIG. 17 is the same as the flow shown in FIG. 9, except that the processing of step 232 for controlling the laser diode driver 106 in order to shut down the laser diode 26 is changed to a step 233 in which processing prompting power supply shutdown of the reception module 14 is added.

In this manner, in the present embodiment, the light emission of the laser diode 26 of the transmission module 12 can be shut down in accordance with the LOP signal fed back from the reception module 14 to the transmission module 12 when the image information signals are not outputted from the host. Thus, power consumption can be reduced. Additionally, with respect to the reception module 14 continuing ordinary operation in the standby state, in the present embodiment, a signal that controls the power supply from the transmission module 12 is outputted. Thus, it becomes possible to implement power consumption of a necessary minimum, and it becomes possible to reduce current consumption.

An aspect of the invention is applied to a signal transmission device including: a transmission unit that converts an inputted electrical signal including image information into an optical signal including the image information, converts the electrical signal into an electrical control signal including control information other than the image information, outputs the optical signal, and inputs and outputs the control signal; a reception unit that inputs the optical signal, inputs and outputs the control signal, and outputs an output-use electrical signal including image information from the optical signal and the control signal; and a transmitting unit configured by an optical fiber cable that transmits the optical signal and an electrical cable that transmits the control signal.

In the signal transmission device, the transmission unit of the invention includes: an electrical-optical conversion unit that converts the inputted electrical signal into an optical signal including image information and outputs the optical signal; a transmission-side electrical signal input and output unit that is disposed independently from the electrical-optical conversion unit and inputs and outputs the control signal including control information other than the image information; a transmission-side detection unit that detects the image information from the inputted electrical signal; a receiving unit that receives, from the reception unit, a status signal representing an arrival status of the outputted optical signal; and a control unit that controls the electrical-optical conversion unit on the basis of the detection result of the transmission-side detection unit and the status signal of the receiving unit so that the output of the optical signal is shut down in at least one of a case where image information is not included in the electrical signal and a case where the optical signal has not arrived.

The transmission-side detection unit outputs, to the control unit, a release signal that releases the shutdown of the output of the optical signal when the transmission-side detection unit detects the image information from a no-signal state in order to output the optical signal.

When the output of the electrical signal including image information from the host computer begins, it is necessary to move from a state (no-signal state) conforming to both the fact that image information is not included in the electrical signal prior thereto and the fact that the optical signal has not arrived. There are also cases where image information is shut down during normal operation and restored from the no-signal state. Thus, by outputting, to the control unit, the release signal that releases the shutdown of the output of the optical signal when the transmission-side detection unit detects the image information from the no-signal state, the optical signal can be reliably outputted.

The control unit includes a reset input unit that inputs a reset signal, with the control unit controlling the electrical-optical conversion unit so that the shutdown of the output of the optical signal is released when the reset signal has been inputted when the control unit is controlling the electrical-optical conversion unit to shut down the output of the optical signal.

The output of the optical signal is shut down when image information is not included in the electrical signal or when the optical signal does not arrive due to cutting of the optical fiber cable, but when this shutdown is conducted continuously, the operation of the transmission unit must be cancelled. For this reason, by configuring the invention so that a reset input unit that inputs a reset signal is disposed, with the control unit releasing the shutdown of the output of the optical signal when the reset signal has been inputted when the control unit is controlling the electrical-optical conversion unit to shut down the output of the optical signal, the state of the transmission unit can be easily restored to a period intended by the user.

The control unit further includes a switch unit that supplies or cuts off power to the electrical-optical conversion unit, with the control unit controlling the switch unit so that power is supplied to the electrical-optical conversion unit when a startup signal is included in the inputted electrical signal including the image information.

Power consumption in the transmission unit is of course effected with respect to the electrical signal including image information, and there are many times where there is unnecessary power consumption at times other than this. Thus, by controlling the switch unit so that power is supplied to the electrical-optical conversion unit when a startup signal that is be outputted when the host device starts up is included in the inputted electrical signal including the image information, power can be saved in the transmission unit.

The control unit includes, in the control signal, a signal representing the power supply and further outputs the signal to the reception unit when power is supplied to the electrical-optical conversion unit by the switch unit.

It is preferable for the operations of the transmission unit and the reception unit to be associated. Thus, by configuring the invention so that the control unit includes, in the control signal, a signal representing the power supply and further outputs the signal to the reception unit when power is supplied to the electrical-optical conversion unit by the switch unit, the power supply in the reception unit can be controlled by this signal in the reception unit reception this. Thus, power can be saved so that the power supply is prompted with respect not only to the transmission unit but also other devices such as the reception unit in accordance with the demand from the host device.

The control unit includes a power control unit that includes, in the control signal, the signal representing the power supply and outputs the signal to the reception unit when image information is included in the electrical signal and the optical signal has arrived when power is supplied to the electrical-optical conversion unit by the switch unit.

The reception unit outputs the status signal when the optical signal from the transmission unit has arrived. For this reason, it is preferable for the power to be supplied at least during the operation of the transmission unit. However, at the transmission side, in a case where image information is not included in the electrical signal or a case where the optical signal has not arrived, the reception side does not have to be started up. Thus, by configuring the invention so that the power control unit includes, in the control signal, the signal representing the power supply and outputs the signal to the reception unit only when image information is included in the electrical signal and the optical signal has arrived, the power supply can be cut off in a state where it is predicted that there is not power consumption in the reception unit. Thus, appropriate power supply can be prompted with respect to other devices such as the reception unit and power can be saved in accordance with the demand from the host device and in accordance with the status of the transmission unit.

The power control unit includes, in the control signal, the signal representing the power supply and outputs the signal to the reception unit when a no-signal state in order to output the optical signal has shifted to a state where the image information.

In a case where the output of the electrical signal including the image information from the host device starts, the signal transmission device moves from a state (no-signal state) conforming to both the fact that image information is not included in the electrical signal prior thereto and the fact that the optical signal has not arrived. There are also cases where the image information is shut down during normal operation and restored from the no-signal state. Thus, by including, in the control signal, the signal representing the power supply when the image information is detected from the no-signal state and outputting this to the control unit, turning ON the power to the reception unit can be reliably prompted.

The receiving unit sets a status signal to a voltage level for shutting down the output of the optical signal in the control unit and outputs the status signal when the status signal is one other than a status signal representing the arrival of the optical signal due to at least one of non-connection and cutting.

In a case where the signal level is predetermined as the status signal representing the arrival of the optical signal, sometimes the signal level of the status signal becomes unstable when it is one other than the status signal representing the arrival of the optical signal. Thus, by setting the status signal to a voltage level for shutting down the output of the optical signal when the status signal is one other than a status signal representing the arrival of the optical signal, the status can be stably outputted. A pull-down resistor or a pull-up resistor may be disposed to set the voltage level.

The transmission-side detection unit compares the amplitude of the inputted electrical signal with a predetermined amplitude corresponding to the image information, and detects image information on the basis of the comparison result.

Even with an electrical signal or an optical signal, coding is conducted so that the same code is not continuous for a period equal to or greater than a period in which the signal to be transmitted has been set in order to raise the noise resistance of the transmission path when the transmission band of the signal becomes high. For example, 8B10B coding in the fiber channel and Gigabit Ethernet corresponds to this. Due to coding, the abundance ratio of 0 and 1 approaches 50% and the signal can be made into a high-frequency signal (AC signal) having a constant amplitude without having a low-frequency component. Additionally, only an AC signal is passed by disposing a high-pass filter in the middle of the transmission path, and the direct current (DC) noise component is cancelled. However, instead, a DC signal where, for example, a low level and a high level are continuous is not passed. Even in the signal transmission device of the present invention, the image information signal that the host transmits in accordance with the DVI specification is a signal coded to AC, and is a signal with an amplitude where 0 and 1 appropriately change. When the image information signal is shut down, the coded signal ends up being shut down and fixed to a constant potential. Thus, the determination of 0 and 1 cannot be done after passing through the high-pass filter and the signal becomes an unstable state with no amplitude. Thus, the amplitude corresponding to the image information is predetermined, and the determined amplitude is compared with the amplitude of the inputted electrical signal, whereby it can be determined whether or not there is image information. For example, in a case where an electrical signal of an amplitude exceeding the predetermined amplitude corresponding to the image information is inputted, it can be determined that image information is included and, on the basis of this, the image information can be detected.

The transmission-side detection unit includes an extraction unit that extracts a clock from the image information included in the inputted electrical signal, with the image information being detected when the clock is extracted by the extraction unit.

When the image information is expressed by an electrical signal, there are many cases where pixels and reference clocks corresponding to pixels overlap. Usually, the clock component serving as the base of the signal can be extracted from the AC-coded signal. Also, the clock cannot be extracted when the image information is not constant. Thus, when the clock of the inputted image information signal was able to be extracted, it can be determined that image information is included. Thus, by extracting the clock corresponding to the image information, it can be determined that image information is included and the image information can be detected. In the extraction unit, there is a clock extraction circuit using a circuit that outputs a lock signal (detecting the fact that a significant clock has entered the PLL circuit) of the clock from the PLL circuit and a clock recovery circuit.

The control unit includes a notification unit that gives notification of the fact that trouble has occurred in regard to the output of an optical signal when the image information is detected in the transmission-side detection unit and the status signal of the receiving unit is one other than a status signal representing the arrival status of the optical signal.

In the signal transmission device, and particularly in the transmission unit, it is preferable to detect trouble when some kind of trouble occurs. Thus, by disposing a notification unit that gives notification of the fact that trouble has occurred in regard to the output of the optical signal when the image information is detected in the transmission-side detection unit and the status signal of the receiving unit is one other than a status signal representing the arrival status of the optical signal, notification can easily be given of the fact that some kind of trouble has occurred.

The notification unit is, for example, for displaying this with a display device such as an LED at the time the power is turned ON and during the operation of signal transmission. Namely, the notification unit is for displaying the fact that trouble has occurred at the time of the occurrence of poor signal transmission operation, such as when one of the optical fiber cable transmitting the optical signal and the electrical cable transmitting the electrical signal has been become unplugged during signal transmission, or when one or both cables have been cut. By configuring the notification unit so that trouble can be visually confirmed from the outside such as an external case, the user can confirm, with the notification unit, that trouble has occurred.

The electrical-optical conversion unit, the transmission-side detection unit and the control unit are plurally configured in correspondence to individual signals included in the image signal.

With the optical fiber cable transmitting the optical signal, plural optical signals can be overlapped and transmitted. Plural individual signals are also present in the electrical signal resulting from the image information. Thus, by plurally configuring the electrical-optical conversion unit, the transmission-side detection unit and the control unit in correspondence to individual signals included in the image signal, the optical signal including image information can be controlled per individual signal included therein and outputted.

In another aspect of the invention, a reception unit of the signal transmission device includes: an optical-electrical conversion unit that converts the optical signal outputted from the transmission unit into an electrical signal and outputs the electrical signal, a reception-side electrical signal input and output unit that is disposed independently from the optical-electrical conversion circuit board and inputs and outputs the control signal including control information other than the image information, and a reception-side detection unit that detects an arrival status of the optical signal from the converted electrical signal and outputs, to the transmission unit, a status signal representing the arrival status of the optical signal of the detection result.

The signal transmission device further includes a reception-side switch unit that supplies or cuts off power to the optical-electrical conversion unit, wherein the reception-side switch unit is controlled so that power is supplied to the optical-electrical conversion unit when a signal representing the power supply to the electrical-optical conversion unit by the switch unit of the transmission unit is included in the control signal inputted by the reception-side electrical signal input and output unit.

As described above, it is preferable for the operating statuses of the transmission unit and the reception unit to be associated. For this reason, by controlling, in the reception unit, the reception-side switch unit so that power is supplied to the optical-electrical conversion unit when a signal representing the power supply to the electrical-optical conversion unit by the switch unit of the transmission unit is included in the inputted control signal, the power supply in the reception unit can be controlled in accordance with the signal from the transmission unit, and power saving that prompts the power supplies of the transmission unit and the reception unit can be improved in accordance with the demand from the host device.

The reception-side detection unit includes a pre-amp that amplifies a current, and the reception-side detection unit compares the amplitude of the electrical signal outputted from the pre-amp with a predetermined amplitude corresponding to the fact that the optical signal has arrived, and sets a status signal representing the arrival status of the optical signal on the basis of the comparison result.

When an optical signal is converted into an electrical signal, there are many cases where the electrical signal is a signal resulting from an extremely weak current. Thus, by configuring the reception-side detection unit to include a pre-amp that amplifies the current, an extremely weak signal can be amplified to a voltage signal that can be easily handled. In a case where the amplified signal is a signal that is not noise such as when it includes AC-coded image information, the signal becomes an electrical signal having a constant amplitude. Thus, by predetermining an amplitude corresponding to the fact that the optical signal has arrived as the amplitude of the electrical signal outputted from the pre-amp and comparing the determined amplitude with the amplitude of the electrical signal outputted from the pre-amp, it can be determined whether or not the optical signal has reached the reception unit. For example, in a case where an electrical signal of an amplitude exceeding the predetermined amplitude is inputted, it is determined that the optical signal has reached the reception unit and, on the basis of this, the status signal representing the arrival status of the optical signal can be set.

The optical-electrical conversion unit and the reception-side detection unit are plurally configured in correspondence to individual signals included in the image signal.

As described above, with the optical fiber cable transmitting the optical signal, it is possible to overlap and transmit plural optical signals. Thus, by plurally configuring the electrical-optical conversion unit, the transmission-side detection unit and the control unit in correspondence to individual signals included in the image signal, the optical signal including image information can be controlled per individual signal included therein and outputted.

What is claimed is:

1. A signal transmission device comprising:
    a transmission unit that converts a first portion of an inputted electrical signal capable of including image information into an optical signal, converts a second portion of the electrical inputted signal into an electrical control signal including control information other than the image information, outputs the optical signal and the electrical control signal;
    a reception unit that inputs the optical signal and the electrical control signal, and outputs an output-use electrical signal including image information from the optical signal and a control signal; and
    an optical fiber cable that transmits the optical signal and an electrical cable, connecting the transmission unit and the reception unit, that transmits the electrical control signal,
    wherein the transmission unit includes:
        an electrical-optical conversion unit that converts the first portion of the inputted electrical signal into the optical signal and outputs the optical signal,
        a transmission-side electrical signal input and output unit that is disposed independently from the electrical-optical conversion unit and outputs the electrical control signal including control information other than the image information,
        a transmission-side detection unit that detects the image information from the inputted electrical signal,
        a receiving unit that receives, from the reception unit, a status signal representing an arrival status of the optical signal, and
        a control unit that controls the electrical-optical conversion unit based on a detection result of the transmission-side detection unit and the status signal of the receiving unit so that the optical signal is shut down in a case where image information is not included in the inputted electrical signal.

2. The signal transmission device of claim 1, wherein the transmission-side detection unit outputs, to the control unit, a release signal that releases a shutdown of the optical signal when the transmission-side detection unit detects image information from a no-signal state in order to output the optical signal.

3. The signal transmission device of claim 1, wherein the control unit includes a reset input unit that inputs a reset signal, the control unit controlling the electrical-optical conversion unit so that a shutdown of the optical signal is released when the reset signal has been inputted and the control unit is controlling the electrical-optical conversion unit to shut down the optical signal.

4. The signal transmission device of claim 1, wherein the control unit further includes a switch unit that supplies or cuts off power to the electrical-optical conversion unit, the control unit controlling the switch unit so that power is supplied to the electrical-optical conversion unit when a startup signal is included in the inputted electrical signal.

5. The signal transmission device of claim 4, wherein the control unit includes, in the electrical control signal, a power signal and further outputs the power signal to the reception unit when power is supplied to the electrical-optical conversion unit by the switch unit.

6. The signal transmission device of claim 5, wherein the control unit includes a power control unit that generates the electrical control signal to include the power signal and outputs the power signal to the reception unit when image information is included in the inputted electrical signal and the optical signal has arrived.

7. The signal transmission device of claim 6, wherein the power control unit generates the electrical control signal to include the power signal and outputs the power signal to the reception unit when the signal transmission device shifts from a no-signal state to a state where the image information is included in the inputted electrical signal.

8. The signal transmission device of claim 1, wherein the receiving unit sets the status signal to a voltage level for shutting down the optical signal in the control unit and outputs the status signal when the status signal is other than representing arrival of the optical signal due to at least one of non-connection and cutting.

9. The signal transmission device of claim 1, wherein the transmission-side detection unit compares an amplitude of the inputted electrical signal with a predetermined amplitude corresponding to the image information, and detects image information based on a comparison result.

10. The signal transmission device of claim 1, wherein
    the transmission-side detection unit includes an extraction unit that extracts a clock from the image information included in the inputted electrical signal, and
    the transmission-side detection unit determines that the image information is detected when the clock is extracted by the extraction unit.

11. The signal transmission device of claim 1, wherein the control unit includes a notification unit that gives notification of a fact that trouble has occurred in regard to an optical signal when the image information is detected in the transmission-side detection unit and the status signal of the receiving unit is present.

12. The signal transmission device of claim 1, wherein the electrical-optical conversion unit, the transmission-side detection unit and the control unit are configured to correspond to characteristics of image information in the inputted electrical signal.

13. A signal transmission device comprising:
    a transmission unit that converts a first portion of an inputted electrical signal capable of including image information into an optical signal, converts a second portion of the inputted electrical signal into an electrical control signal including control information other than the image information, outputs the optical signal and the electrical control signal;
    a reception unit that inputs the optical signal and the electrical control signal, and outputs an output-use electrical signal including image information from the optical signal and a control signal; and an optical fiber cable that transmits the optical signal and an electrical cable, connecting the transmission unit and the reception unit, that transmits the electrical control signal, wherein the reception unit includes:
an optical-electrical conversion unit that converts the optical signal outputted from the transmission unit into an electrical signal and outputs the electrical signal,
a reception-side electrical signal input and output unit that is disposed independently from the optical-electrical conversion unit and inputs and outputs the electrical control signal including control information other than the image information, and
a reception-side detection unit that detects an arrival status of the optical signal from the converted electrical signal and outputs, to the transmission unit, a status signal representing the arrival status of the optical signal of the detection result, and wherein the transmission unit includes:
a control unit that controls an electrical-optical conversion unit based on a detection result of a transmission-side detection unit and a status signal of a receiving unit so that the optical signal is shut down in a case where image information is not included in the inputted electrical signal.

14. The signal transmission device of claim 13, further comprising a reception-side switch unit that supplies or cuts off power to the optical-electrical conversion unit, wherein the reception-side switch unit is controlled so that power is supplied to the optical-electrical conversion unit when a signal representing that power is being supplied to the electrical-optical conversion unit by a switch unit of the transmission unit is included in the electrical control signal inputted by the reception-side electrical signal input and output unit.

15. The signal transmission device of claim 13, wherein the reception-side detection unit includes a pre-amp that amplifies a current, and the reception-side detection unit compares an amplitude of the electrical signal outputted from the pre-amp with a predetermined amplitude corresponding to a fact that the optical signal has arrived, and sets a status signal representing the arrival status of the optical signal based on a comparison result.

16. The signal transmission device of 13, wherein the optical-electrical conversion unit and the reception-side detection unit are configured to correspond to characteristics of the image information in the inputted electrical signal.

17. A signal transmission device comprising:
a transmission unit that includes
an electrical-optical conversion unit that converts a first portion of an inputted electrical signal into an optical signal capable of including image information and outputs the optical signal,
a transmission-side electrical signal output unit that is disposed independently from the electrical-optical conversion unit and outputs an electrical control signal including control information other than the image information,
a transmission-side detection unit that detects the image information from the inputted electrical signal,
a receiving unit that receives, from a reception unit, a status signal representing an arrival status of the optical signal, and
a control unit that controls the electrical-optical conversion unit based on a detection result of the transmission-side detection unit and the status signal of the receiving unit so that the optical signal is shut down in a case where image information is not included in the inputted electrical signal;

a reception unit that includes:
an optical-electrical conversion unit that converts the optical signal outputted from the transmission unit into an electrical signal and outputs the electrical signal,
a reception-side electrical signal input and output unit that is disposed independently from the optical-electrical conversion unit and inputs the electrical control signal including control information other than the image information, and
reception-side detection unit that detects an arrival status of the optical signal from the converted electrical signal and outputs, to the transmission unit, a status signal representing the arrival status of the optical signal of the detection result; and an optical fiber cable that transmits the optical signal and an electrical cable, connecting the transmission unit and the reception unit, that transmits the control signal.

18. A signal transmission device comprising:
a transmission unit that converts a first portion of an inputted electrical signal capable of including image information into an optical signal, converts a second portion of the inputted electrical signal into an electrical control signal including control information other than the image information, outputs the optical signal and the electrical control signal;
a reception unit that inputs the optical signal and the electrical control signal, and outputs an output-use electrical signal including image information from the optical signal and a control signal; and
an optical fiber cable that transmits the optical signal and an electrical cable, connecting the transmission unit and the reception unit, that transmits the electrical control signal, wherein the transmission unit includes:
an electrical-optical conversion unit that converts the first portion of the inputted electrical signal into the optical signal and outputs the optical signal,
a transmission-side electrical signal output unit that is disposed independently from the electrical-optical conversion unit and outputs the electrical control signal including control information other than the image information,
a transmission-side detection unit that detects the image information from the inputted electrical signal,
a receiving unit that receives, from the reception unit, a status signal representing an arrival status of the optical signal, and
a prohibition unit that generates the control signal to include a power signal and prohibits the power signal from being outputted to the reception unit based on a detection result of the transmission-side detection unit and the status signal of the receiving unit in case where image information is not included in the electrical signal.

* * * * *